(12) United States Patent
Croggon et al.

(10) Patent No.: US 11,540,686 B2
(45) Date of Patent: Jan. 3, 2023

(54) CLEANING DEVICE

(71) Applicant: SharkNinja Operating LLC, Needham, MA (US)

(72) Inventors: Hugh James Croggon, Berkshire (GB); Richard Mathias, Brookline, MA (US); Michael James Douglas, London (GB); Brandon Suleski, Cambridge, MA (US); Keith Osteen, Beaufort, SC (US); Samuel Emrys James, London (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/039,137

(22) Filed: Sep. 30, 2020

(65) Prior Publication Data

US 2021/0022575 A1     Jan. 28, 2021

Related U.S. Application Data

(63) Continuation of application No. 16/718,725, filed on Dec. 18, 2019.

(Continued)

(51) Int. Cl.
*A47L 9/14*     (2006.01)
*A47L 9/02*     (2006.01)
(Continued)

(52) U.S. Cl.
CPC .............. *A47L 9/1409* (2013.01); *A47L 5/28* (2013.01); *A47L 9/02* (2013.01); *A47L 9/122* (2013.01);
(Continued)

(58) Field of Classification Search
CPC . A47L 9/1409; A47L 5/28; A47L 9/02; A47L 9/122; A47L 9/149; A47L 11/307;
(Continued)

(56) References Cited

U.S. PATENT DOCUMENTS

| | | |
|---|---|---|
| 490,472 A | 1/1893 | Clements |
| 2,055,734 A | 9/1936 | Sparklin |

(Continued)

FOREIGN PATENT DOCUMENTS

| | | |
|---|---|---|
| CN | 1764405 A | 4/2006 |
| CN | 1889881 A | 1/2007 |

(Continued)

OTHER PUBLICATIONS (2016) Amazon.com—Shark Genius Steam Pocket Mop Hard Floor Cleaner, oldest reviews 2016, https://lwww.amazon.com/cleaner-Blaster-Technology-Intelligent-S5003D/dp/B01KU4BSGK/ref=cm_cr arp_d_product_top?ie=UTF8, 11 pages.

(Continued)

*Primary Examiner* — Joseph J Hail
*Assistant Examiner* — Shantese L McDonald
(74) *Attorney, Agent, or Firm* — Mintz Levin Cohn Ferris Glovsky and Popeo, PC; Lisa Adams

(57) ABSTRACT

Apparatus and method for receiving and holding debris in a collection chamber of a vacuum cleaner. The collection chamber has an inlet opening through which debris-entrained air enters the collection chamber. When the vacuum cleaner is off, an internal valve prevents debris from leaving the collection chamber through the inlet opening. The internal valve is movable from a first sealed position, in which the internal valve covers the chamber inlet opening, to a second unsealed position in which the internal valve does not cover the chamber inlet opening.

22 Claims, 21 Drawing Sheets

Related U.S. Application Data

(60) Provisional application No. 62/781,436, filed on Dec. 18, 2018, provisional application No. 62/816,867, filed on Mar. 11, 2019, provisional application No. 62/931,516, filed on Nov. 6, 2019.

(51) Int. Cl.

| | | |
|---|---|---|
| *A47L 11/30* | (2006.01) | |
| *A47L 11/40* | (2006.01) | |
| *A47L 5/28* | (2006.01) | |
| *A47L 9/12* | (2006.01) | |
| *B32B 5/02* | (2006.01) | |
| *B32B 5/26* | (2006.01) | |
| *B32B 7/05* | (2019.01) | |
| *B01D 46/10* | (2006.01) | |

(52) U.S. Cl.
CPC ............ *A47L 9/149* (2013.01); *A47L 11/307* (2013.01); *A47L 11/408* (2013.01); *A47L 11/4036* (2013.01); *B01D 46/10* (2013.01); *B32B 5/022* (2013.01); *B32B 5/26* (2013.01); *B32B 7/05* (2019.01); *B01D 2279/55* (2013.01); *B32B 2250/20* (2013.01); *B32B 2250/44* (2013.01); *B32B 2262/0253* (2013.01); *B32B 2262/0284* (2013.01); *B32B 2307/728* (2013.01); *B32B 2307/73* (2013.01); *B32B 2432/00* (2013.01)

(58) Field of Classification Search
CPC .... A47L 11/4036; A47L 11/408; B32B 5/022; B32B 5/26; B32B 7/05; B01D 46/10; B01D 2279/55; B01D 2250/20; B01D 2250/44; B01D 2262/0253; B01D 2262/0284; B01D 2307/728; B01D 2307/73; B01D 2432/00
See application file for complete search history.

(56) References Cited

U.S. PATENT DOCUMENTS

| | | | |
|---|---|---|---|
| RE20,489 E | 8/1937 | Leathers | |
| D117,388 S | 10/1939 | Woinarovicz | |
| 3,050,761 A | 8/1962 | Morgan | |
| D214,977 S | 8/1969 | Roth | |
| 3,814,124 A | 6/1974 | Bell | |
| 4,011,624 A | 3/1977 | Proett | |
| 4,063,326 A * | 12/1977 | Fromknecht | A47L 9/0072 15/327.1 |
| D247,949 S | 5/1978 | Tillinghast et al. | |
| D250,245 S | 11/1978 | Bebb | |
| D278,099 S | 3/1985 | Evans | |
| 4,545,794 A | 10/1985 | Himukai | |
| 4,610,047 A | 9/1986 | Dick et al. | |
| 4,706,327 A | 11/1987 | Getz et al. | |
| 5,247,720 A * | 9/1993 | Sovis | A47L 5/32 251/303 |
| 5,365,881 A | 11/1994 | Sporn | |
| 5,664,285 A | 9/1997 | Melito et al. | |
| 5,829,090 A | 11/1998 | Melito et al. | |
| D423,157 S | 4/2000 | Hodges | |
| 6,102,278 A | 8/2000 | Rothas | |
| 6,117,200 A | 9/2000 | Berg et al. | |
| 6,453,506 B1 | 9/2002 | Sumner | |
| 6,571,421 B1 | 6/2003 | Sham et al. | |
| 6,797,357 B2 | 9/2004 | Fereshtehkhou et al. | |
| 6,799,351 B2 | 10/2004 | Porath | |
| 6,966,098 B2 | 11/2005 | Sako et al. | |
| 7,013,528 B2 | 3/2006 | Parker et al. | |
| 7,048,804 B2 | 5/2006 | Kisela et al. | |
| 7,137,169 B2 | 11/2006 | Murphy et al. | |
| 7,150,069 B2 | 12/2006 | Hori et al. | |
| D548,907 S | 8/2007 | Killen | |
| 7,293,322 B2 | 11/2007 | Matousek et al. | |
| 7,329,294 B2 | 2/2008 | Conrad | |
| 7,337,494 B2 | 3/2008 | Baer et al. | |
| 7,409,745 B2 | 8/2008 | Dodson et al. | |
| 7,418,763 B2 * | 9/2008 | Shaver | A47L 5/14 15/330 |
| 7,451,519 B2 * | 11/2008 | Nishinaka | A47L 9/02 15/231 |
| D597,717 S | 8/2009 | Rosenzweig et al. | |
| 7,673,361 B2 | 3/2010 | Policicchio et al. | |
| 7,676,877 B2 | 3/2010 | Policicchio et al. | |
| 7,861,351 B2 | 1/2011 | Ho | |
| 7,934,287 B2 * | 5/2011 | De Soto-Burt | A47L 5/28 15/339 |
| 8,020,236 B2 | 9/2011 | Kaleta et al. | |
| 8,062,398 B2 | 11/2011 | Luo et al. | |
| 8,065,778 B2 | 11/2011 | Kim et al. | |
| D661,034 S | 5/2012 | Ediger et al. | |
| D672,107 S | 12/2012 | Van Landingham, Jr. et al. | |
| 8,341,802 B2 | 1/2013 | Kim et al. | |
| 8,458,850 B2 | 6/2013 | Kasper et al. | |
| 8,495,781 B2 | 7/2013 | Dingert | |
| 8,584,309 B2 | 11/2013 | Santiago | |
| D703,407 S | 4/2014 | Xiong | |
| 8,769,764 B2 | 7/2014 | Crouch et al. | |
| D731,137 S | 6/2015 | Colangelo | |
| D764,127 S | 8/2016 | Vicari et al. | |
| D766,584 S | 9/2016 | Blouin et al. | |
| 9,504,366 B2 | 11/2016 | Kasper et al. | |
| 9,545,180 B2 | 1/2017 | Conrad | |
| 9,560,944 B2 | 2/2017 | Grey | |
| 9,661,968 B2 | 5/2017 | Bradbury | |
| 9,788,695 B2 | 10/2017 | Wood | |
| D804,123 S | 11/2017 | Orsino | |
| 9,883,780 B2 | 2/2018 | Kim et al. | |
| 9,901,231 B2 | 2/2018 | Tibberts | |
| D817,574 S | 5/2018 | Libman et al. | |
| 10,716,439 B2 * | 7/2020 | James | A47L 13/256 |
| 2003/0159230 A1 | 8/2003 | Oh | |
| 2003/0217432 A1 | 11/2003 | Oh et al. | |
| 2003/0221274 A1 | 12/2003 | Makhija et al. | |
| 2004/0045126 A1 | 3/2004 | Parker et al. | |
| 2004/0134016 A1 | 7/2004 | Kisela et al. | |
| 2004/0134025 A1 * | 7/2004 | Murphy | A47L 5/24 15/403 |
| 2004/0139572 A1 | 7/2004 | Kisela et al. | |
| 2004/0141798 A1 | 7/2004 | Garabedian et al. | |
| 2004/0168281 A1 | 9/2004 | Sako et al. | |
| 2004/0211022 A1 | 10/2004 | Fan | |
| 2004/0250376 A1 | 12/2004 | Hori et al. | |
| 2005/0115409 A1 | 6/2005 | Conrad | |
| 2005/0132680 A1 | 6/2005 | Wegelin et al. | |
| 2005/0193516 A1 | 9/2005 | Hughes | |
| 2006/0000052 A1 | 1/2006 | Budd | |
| 2006/0123590 A1 | 6/2006 | Fester | |
| 2007/0061040 A1 | 3/2007 | Augenbraun et al. | |
| 2007/0245511 A1 | 10/2007 | Hahm et al. | |
| 2007/0251050 A1 | 11/2007 | Harsh et al. | |
| 2008/0040876 A1 | 2/2008 | Aiyar | |
| 2008/0235899 A1 * | 10/2008 | Haan | F04D 25/082 55/342 |
| 2008/0276407 A1 | 11/2008 | Schnittman et al. | |
| 2009/0100636 A1 | 4/2009 | Sohn et al. | |
| 2010/0024155 A1 | 2/2010 | Policicchio et al. | |
| 2010/0024156 A1 | 2/2010 | De et al. | |
| 2010/0024157 A1 * | 2/2010 | Vernon | A47L 9/0686 15/403 |
| 2010/0115719 A1 | 5/2010 | West et al. | |
| 2010/0251497 A1 | 10/2010 | Arnold | |
| 2010/0306939 A1 | 12/2010 | Dingert | |
| 2011/0088209 A1 * | 4/2011 | Ivarsson | A47L 9/0686 15/393 |
| 2012/0110775 A1 | 5/2012 | Krebs | |
| 2012/0159728 A1 | 6/2012 | Suda et al. | |
| 2012/0211625 A1 * | 8/2012 | Schultink | A47L 9/1454 248/311.2 |
| 2012/0311813 A1 | 12/2012 | Gilbert et al. | |
| 2013/0055521 A1 | 3/2013 | Lee et al. | |

(56) References Cited

U.S. PATENT DOCUMENTS

| | | |
|---|---|---|
| 2013/0291333 A1 | 11/2013 | Grey |
| 2014/0033470 A1 | 2/2014 | Codling |
| 2014/0033471 A1 | 2/2014 | Toole et al. |
| 2015/0101617 A1 | 4/2015 | Duffy |
| 2015/0128364 A1 | 5/2015 | Dooley et al. |
| 2015/0223662 A1 | 8/2015 | Doherty-Stapp et al. |
| 2015/0250368 A1 | 9/2015 | Kim et al. |
| 2016/0100735 A1 | 4/2016 | Milanese et al. |
| 2016/0174793 A1 | 6/2016 | Burke et al. |
| 2016/0278594 A1 | 9/2016 | Bradbury |
| 2016/0353963 A1 | 12/2016 | Kellis et al. |
| 2017/0007086 A1 | 1/2017 | Kleine-Doepke et al. |
| 2017/0119223 A1 | 5/2017 | Staf |
| 2017/0202421 A1 | 7/2017 | Hwang et al. |
| 2018/0014711 A1 | 1/2018 | Rostami |
| 2018/0035855 A1 | 2/2018 | Wood |
| 2018/0055315 A1 | 3/2018 | Conrad |
| 2018/0177367 A1 | 6/2018 | Amaral et al. |
| 2018/0220861 A1 | 8/2018 | Zhang et al. |
| 2019/0269289 A1 | 9/2019 | Xu et al. |
| 2019/0274500 A1 | 9/2019 | Thorne et al. |

FOREIGN PATENT DOCUMENTS

| | | |
|---|---|---|
| CN | 101061929 A | 10/2007 |
| CN | 102112030 A | 6/2011 |
| CN | 102961085 A | 3/2013 |
| CN | 103356140 A | 10/2013 |
| CN | 205181229 U | 4/2016 |
| CN | 107028564 A | 8/2017 |
| CN | 209595637 U | 11/2019 |
| DE | 567452 C | 11/1938 |
| EP | 1027844 A2 | 8/2000 |
| EP | 1219222 A1 | 7/2002 |
| EP | 1525839 A2 | 4/2005 |
| GB | 2161902 A | 1/1986 |
| JP | 2003326121 A | 11/2003 |
| JP | 2006198083 A | 8/2006 |
| JP | 2008206944 A | 9/2008 |
| JP | 2008228768 A | 10/2008 |
| JP | D1489801 S | 2/2014 |
| JP | 2014200435 A | 10/2014 |
| KR | 1020060112749 A | 11/2006 |
| KR | 20170043227 A | 4/2017 |
| WO | 2004062454 A2 | 7/2004 |
| WO | 2004062457 A2 | 7/2004 |
| WO | 2005018402 A2 | 3/2005 |
| WO | 2010014366 A1 | 2/2010 |
| WO | 2010014367 A1 | 2/2010 |
| WO | 2011017493 A2 | 2/2011 |
| WO | 2011112545 A2 | 9/2011 |
| WO | 2014020303 A1 | 2/2014 |
| WO | 2014104503 A1 | 7/2014 |
| WO | 2016022270 A1 | 2/2016 |
| WO | 2016062647 A1 | 4/2016 |
| WO | 2016095040 A1 | 6/2016 |
| WO | 2016100964 A2 | 6/2016 |
| WO | 2017144918 A1 | 8/2017 |

OTHER PUBLICATIONS

Extended European Search Report received for EP Application No. 18854457.1, dated Apr. 2, 2020, 5 pages.

Extended European Search Report received for EP Application No. 19215569.5, dated May 15, 2020, 5 pages.

International Preliminary Report on Patentability received for PCT Application No. PCT/US2018/050308, dated Mar. 26, 2020, 13 pages.

International Search Report and Written Opinion received for PCT Application No. PCT/US2019/059327, dated Feb. 6, 2020, 10 pages.

International Search Report and Written Opinion received for PCT Application No. PCT/US2018/050308, dated Nov. 26, 2018, 15 pages.

International Search Report and Written Opinion received for PCT Application No. PCT/US2019/067121, dated May 7, 2020, 12 pages.

International Search Report and Written Opinion received for PCT Application No. PCT/US2020/058146, dated Feb. 2, 2021, 13 pages.

International Search Report and Written Opinion received for PCT Application No. PCT/US2020/058162, dated Feb. 2, 2021, 12 pages.

International Search Report and Written Opinion received for PCT Application No. PCT/US2020/059491, dated Feb. 2, 2021, 9 pages.

International Search Report and Written Opinion received for PCT Application No. PCT/US2020/059503, dated Feb. 3, 2021, 7 pages.

International Search Report and Written Opinion received in PCT Application No. PCT/US2020/058195, dated Dec. 21, 2020, 13 pages.

Invitation to Pay Additional Fees received for PCT Application No. PCT/US2020/062158, dated Jan. 11, 2021, 2 pages.

(Aug. 1, 2019) N.K. Multi-Tech Filters Pvt. Limited, Available at: https://www.airfiltersindia.net/product_temp_No_Upload.html, 4 Pages.

International Search Report and Written Opinion received for PCT Application No. PCT/IB2020/062158, dated Mar. 24, 2021, 11 pages.

Extended European Search Report issued in European Application No. 21212780.7 dated Apr. 4, 2022, 5 pages.

\* cited by examiner

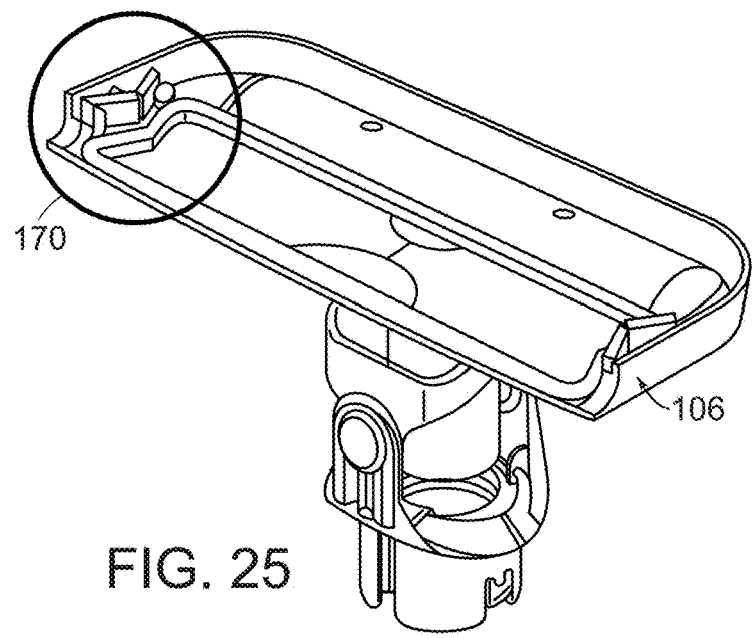
FIG. 25
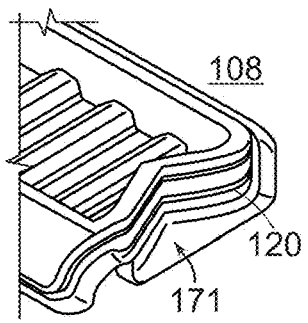
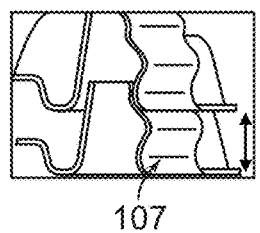
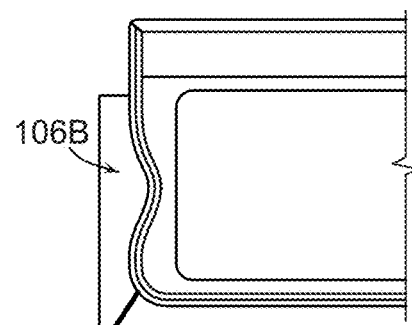
FIG. 26
FIG. 27
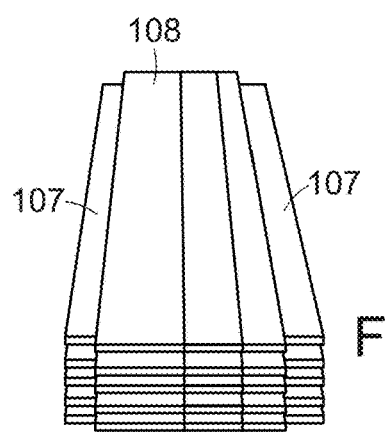
FIG. 28

CLEANING DEVICE

CROSS-REFERENCE TO RELATED APPLICATIONS

This application claims priority under 35 U.S.C. 120 and is a continuation of U.S. patent application Ser. No. 16/718,725, entitled "CLEANING DEVICE" and filed on Dec. 18, 2019. U.S. patent application Ser. No. 16/718,725 claims priority under 35 U.S.C. 119(e) to U.S. Provisional App. No. 62/781,436, entitled "CLEANING DEVICE" and filed Dec. 18, 2018, U.S. Provisional App. No. 62/816,867, entitled "CLEANING DEVICE" and filed Mar. 11, 2019, and U.S. Provisional App. No. 62/931,516, entitled "CLEANING DEVICE" and filed Nov. 6, 2019, the entirety of each of which is incorporated herein by reference.

FIELD

Embodiments disclosed herein related generally to cleaning devices, and more specifically to vacuums and cleaning heads for vacuums.

DESCRIPTION OF THE RELATED ART

Cleaning devices are used in the home and office to clean floors and other surfaces. Various types of cleaning devices are known, such as vacuums with disposable bags, and vacuums with dirt bins that can be emptied and re-used.

SUMMARY

According to one embodiment, a cleaning head includes a debris collection chamber, an air filter, and a cleaning sheet including a retention layer, an acquisition layer, a face layer, and a strip arranged for at least one of scrubbing and providing friction. The layers are attached together.

According to another embodiment, a method of forming a cleaning sheet is disclosed. The method includes adhering an acquisition layer of a first material to a retention layer of a second material, joining together a strip of a third material, the strip arranged for at least one of scrubbing and providing friction, a face layer of a fourth material, and the acquisition layer to form a cleaning sheet, and sealing a forward edge and a rear edge of the cleaning sheet.

According to another embodiment, an apparatus includes a debris collection chamber, an air filter configured to allow air to pass through the air filter while inhibiting debris from passing through the air filter, and a collection chamber inlet opening configured to allow debris-entrained air to flow into the collection chamber. The air filter includes an elongated strip that is movable from a first sealed position, in which the elongated strip covers the chamber inlet opening, to a second unsealed position in which the elongated strip does not cover the chamber inlet opening.

According to another embodiment, an apparatus adapted to be attached to a vacuum cleaner includes a debris collection chamber and a collection chamber inlet opening configured to allow debris-entrained air to flow into the debris collection chamber. The apparatus also includes an air filter configured to allow air to pass through the air filter while inhibiting debris from passing through the air filter. An internal valve is provided which is movable from a first position in which the internal valve covers the chamber inlet opening, to a second position in which the internal valve does not cover the chamber inlet opening. The internal valve is attached to the air filter, and the air filter is arranged such that when the air filter is under no negative pressure, the internal valve is in the first position. The internal valve is also arranged such that when negative pressure is applied to the air filter to draw air through the chamber inlet opening, the air filter moves the internal valve to the second position.

According to yet another embodiment, an apparatus adapted to be attached to a cleaning device having a suction source is provided. The apparatus includes a debris collection chamber and a collection chamber inlet opening configured to allow air to flow into the debris collection chamber when negative pressure is applied to the debris collection chamber. The apparatus also includes an internal valve movable from a first position, in which the internal valve covers the chamber inlet opening, to a second position in which the internal valve does not cover the chamber inlet opening. The internal valve includes multiple layers. At least a first layer of the multiple layers is configured to selectively move the internal valve from the first position to the second position at a pleat formed in the first layer.

According to a further embodiment, an apparatus includes a main body including a suction source, and a debris collection chamber removably attachable to the main body. A suction nozzle is fluidically connected to the debris collection chamber and positioned forwardly of the debris collection chamber. The apparatus includes a liquid applicator and a sheet connected to an underside of the debris collection chamber. A surface of the sheet is arranged to contact the floor when the apparatus is in use, and the surface includes an embossed pattern configured to at least temporarily capture debris from the floor.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 25 is a bottom perspective view of a first connector of a cleaning device according to some embodiments;

FIG. 26 shows a portion of a cleaning head engageable with the connector of FIG. 25;

FIG. 27 is another view of the cleaning head of FIG. 26;

FIG. 28 shows a group of stacked cleaning heads according to some embodiments;

DETAILED DESCRIPTION

Figure 1:
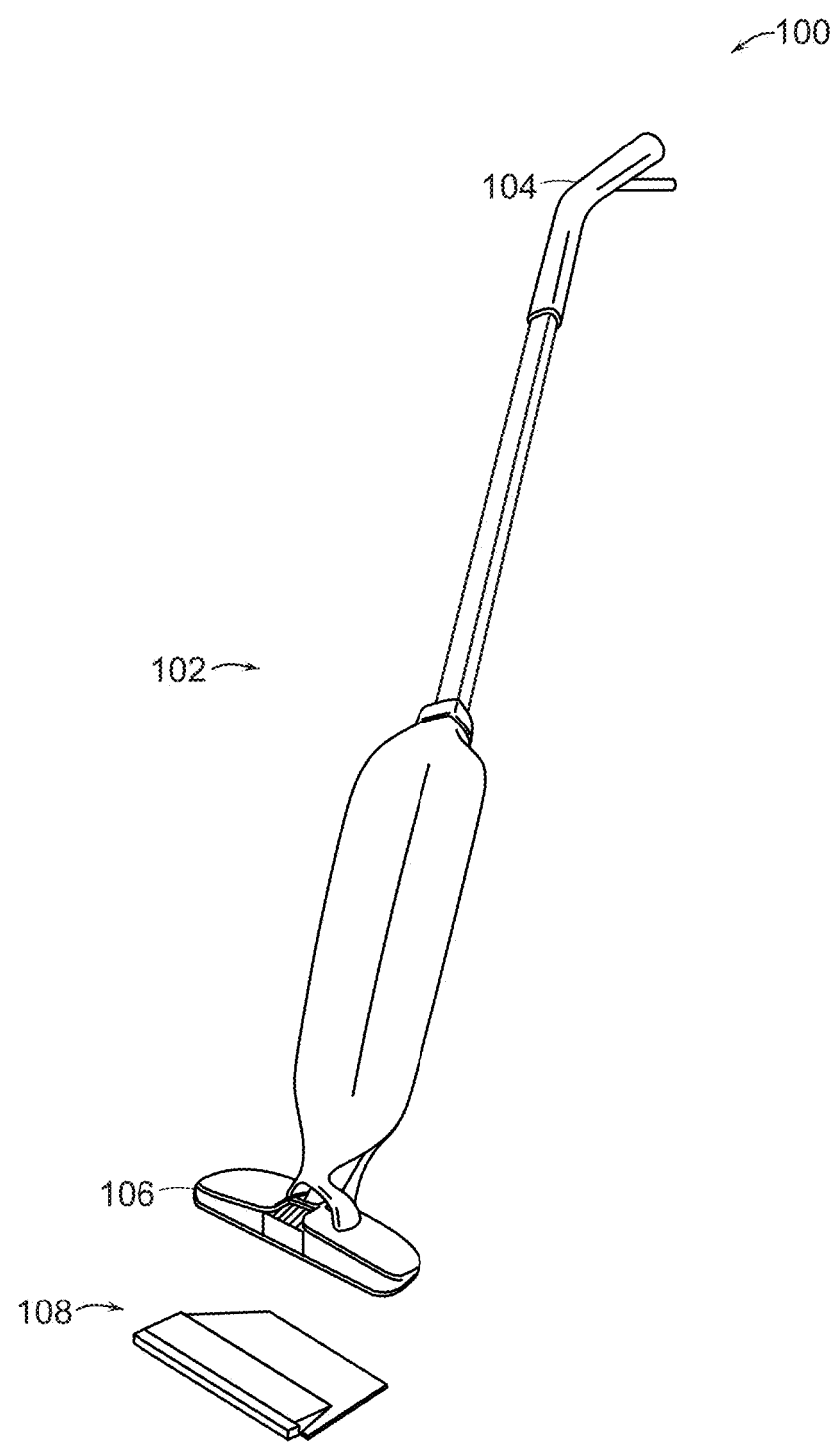
FIG. 1 is a perspective view of a cleaning device according to embodiments of the present disclosure.

Conventional bag vacuums typically require the user to remove a bag from a housing interior, dispose of the bag, and insert a new bag. Removing the bag can put dust in the air and/or result in spilled debris. Cyclonic vacuum cleaners often have a debris collection chamber that can be removed from the body of the vacuum, emptied, and reused.

For cleanup jobs that do not require a full-size vacuum cleaner, the inventors have appreciated that a debris collection container which remains closed upon removal from the vacuum can be helpful. Disclosed herein are debris collection chamber arrangements which allow debris-entrained air to enter a collection chamber through an inlet opening when the vacuum cleaner is turned on. The collection chamber arrangements may be arranged to cover the inlet opening when the vacuum cleaner is turned off, which may limit undesirable release of debris from the collection chamber. In some embodiments, the collection chamber is disposable. In some embodiments, the collection chamber is attached to a cleaning head, and the entire cleaning head is disposable.

To facilitate covering the collection chamber inlet opening, a cover for the inlet opening may be arranged to move in response to the presence of negative pressure in the vacuum cleaner. For example, a planar piece of filter material may cover the inlet opening when the vacuum cleaner is off. When the vacuum cleaner is turned on and negative pressure is applied to the filter material, the filter material may pull away from the inlet opening, thereby allowing air and debris to enter the collection chamber. The inflow of air may substantially prevent dirt from exiting the collection chamber through the inlet opening. When the vacuum cleaners turned off, the filter material may return to its position covering the inlet opening. Such an arrangement may provide for covering the inlet opening without user intervention.

In some embodiments, the filter material is attached to the debris collection chamber with an elastic connector. In such embodiments, the elastic connector may allow the filter material to be pulled away from the inlet opening when the filter material is subjected to a negative pressure by a suction source. In other embodiments, no elastic connection is provided, and the inherent flexibility of the filter material allows the filter material to move away from the inlet opening.

In some embodiments, the cover for the inlet opening is not a filter material. For example, a piece of filter material may form substantially the entire top wall of a collection chamber, but include an air impermeable portion which covers and uncovers the inlet opening. In still other embodiments, an entire top wall of the collection chamber may be formed of a flexible material other than an air filter. The top wall may move to cover and uncover the inlet opening, while a separate portion of the collection chamber has an air outlet that applies a negative pressure to the collection chamber.

By automatically closing the chamber inlet opening when the vacuum cleaner is turned off, the collection chamber may be completely enclosed to limit release of debris. The arrangement can also be helpful to limit spillage or egress of collected debris from the collection chamber when the user removes and/or transports the collection chamber for debris disposal. In some embodiments, the collection chamber may be adapted for reuse and include an aperture which is selectively openable to discard debris from the chamber. In other embodiments, the collection chamber may be adapted to be disposed of once the chamber is full. For example, in some embodiments the collection chamber may have no openings other than the inlet opening. In some embodiments, the collection chamber is not openable by a user to dispose of debris from the debris collection chamber without damaging the debris collection chamber. The collection chamber may be permanently attached to, and form at least a portion of, a disposable cleaning head in some embodiments, such that the entire head is disposed of after use.

For purposes herein, debris being suctioned into the debris collection chamber may include dry and/or wet media. For example, in some embodiments, a liquid applied to the surface may be absorbed by a cleaning sheet and/or suctioned by the vacuum into the debris collection chamber. In some embodiments, the wet media may be absorbed by at least a portion of the material used to form the debris collection chamber. In some embodiments, the debris collection chamber may be fonned of a material which allows for fluid absorption into the material but does not allow for liquid transfer through the material. In such embodiments, liquid may not travel through the debris collection chamber. For example, the material used to form the debris collection chamber may be absorptive on an inner side of the debris collection chamber, but liquid impermeable.

In some embodiments, advantages may be realized if the user does not have to handle the wet or dirty cleaning head after operation of the cleaning device. For example, the cleaning device may be arranged to release the cleaning head after using the cleaning device such that the user does not have to grasp the cleaning head to discard it. In some embodiments, with a permanently attached debris collection chamber, and a release arrangement that does not require the user to touch the cleaning head, the cleaning head can be disposed of with limited or no user contact.

In some embodiments, the cleaning head includes a support structure to which the debris collection chamber is attached. In such embodiments, the user may simply attach the cleaning head to the cleaning device, operate the cleaning device to move dirt from the surface and into the debris collection chamber, remove the cleaning head, and dispose of the cleaning head in a trash receptacle.

In some embodiments, the cleaning heads are arranged for space-efficient stacking for ease of storage and transport. In some embodiments, the dirt collection chambers are arranged to be collapsible. For example, the dirt collection chamber may include a bag.

Figure 3:
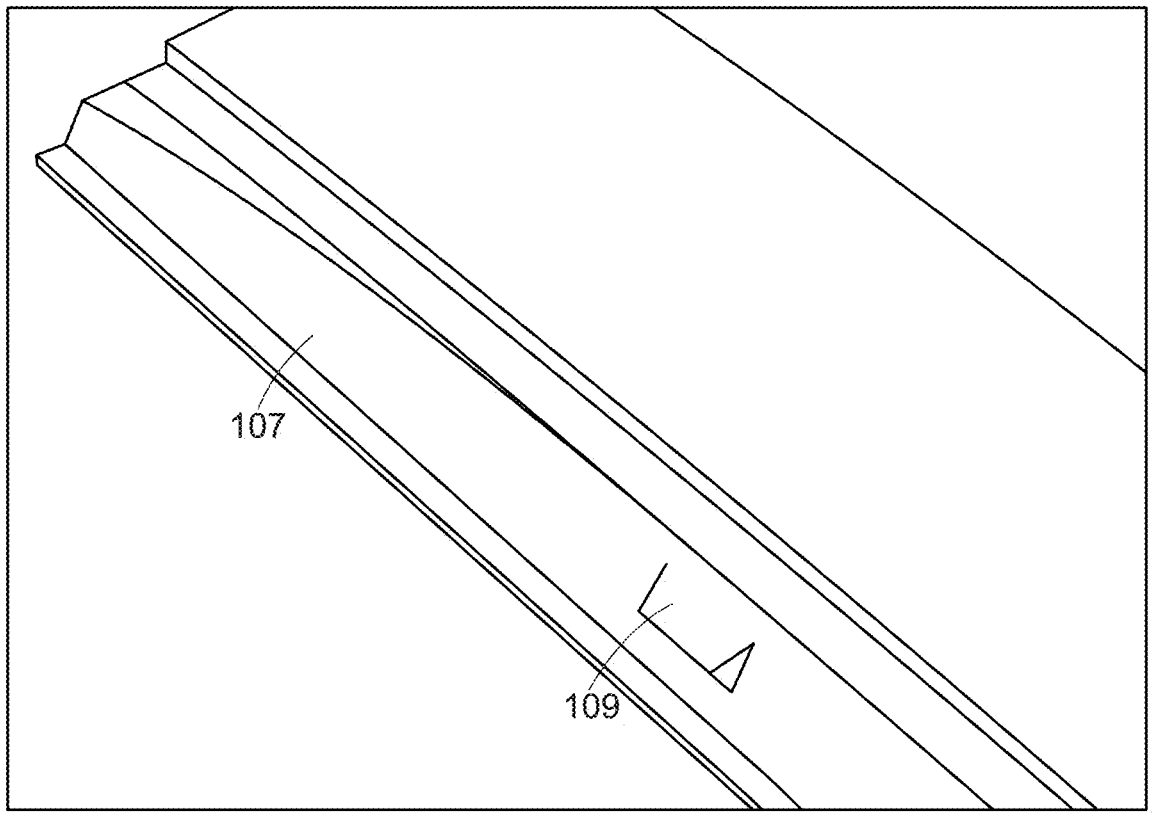
FIG. 3 is an enlarged perspective view of a second connector of the cleaning head of FIG. 2.

FIG. 1 shows a cleaning device 100 according to embodiments of the present disclosure. The cleaning device 100 includes a body 102 with a handle 104, a first connector 106, and a cleaning head 108 which is removably attachable to the body, such as via the first connector 106. For example, as will be described, the body may have a corresponding second connector 109 (see FIG. 3) that engages with the first connector to attach the cleaning head to the body. In some embodiments, the handle may have a length that is adjustable to allow a user to adjust the height of the cleaning device.

As shown by way of example in FIGS. 2-5, the cleaning head 108 may include a suction nozzle 107 to remove debris from a surface, and a debris collection chamber 112, also referred to herein as a collection chamber, to collect the debris removed from the surface. In some embodiments, as shown in these views, the suction nozzle 107 may extend laterally along a front portion of the cleaning head 108. As will be appreciated, the suction nozzle 107 may have any suitable shape and size. For example, the suction nozzle 107 may extend along an entire width of the cleaning head 108 in some embodiments, although in other embodiments, the nozzle may extend along only a portion of the width of the cleaning head.

As shown in these views, in some embodiments, the nozzle is attached, such as integrally formed with, the debris collection chamber. In other embodiments, instead of being attached to the debris collection chamber 112, the suction nozzle 107, or at least a portion of the suction nozzle, may be formed on part of the vacuum cleaner device 100, such as on the first connector. In such embodiments, once the collection chamber 112 is attached to the vacuum cleaner 100, the suction nozzle 107 forms a flow path to the collection chamber inlet opening 116.

As will be appreciated, the debris collection chamber 112 may be any suitable type of container for collecting debris such as dirt, dust, food, or wet media. In some embodiments, the debris collection chamber 112 may be permanently or removably attached to a cleaning sheet 114. For example, the collection chamber 112 may be glued, heat sealed, or otherwise permanently affixed to cleaning sheet 114. As will be further, the cleaning sheet and the collection chamber need not be the same shape or size. For example, the cleaning sheet may be larger than the collection chamber in some embodiments.

Figure 2:
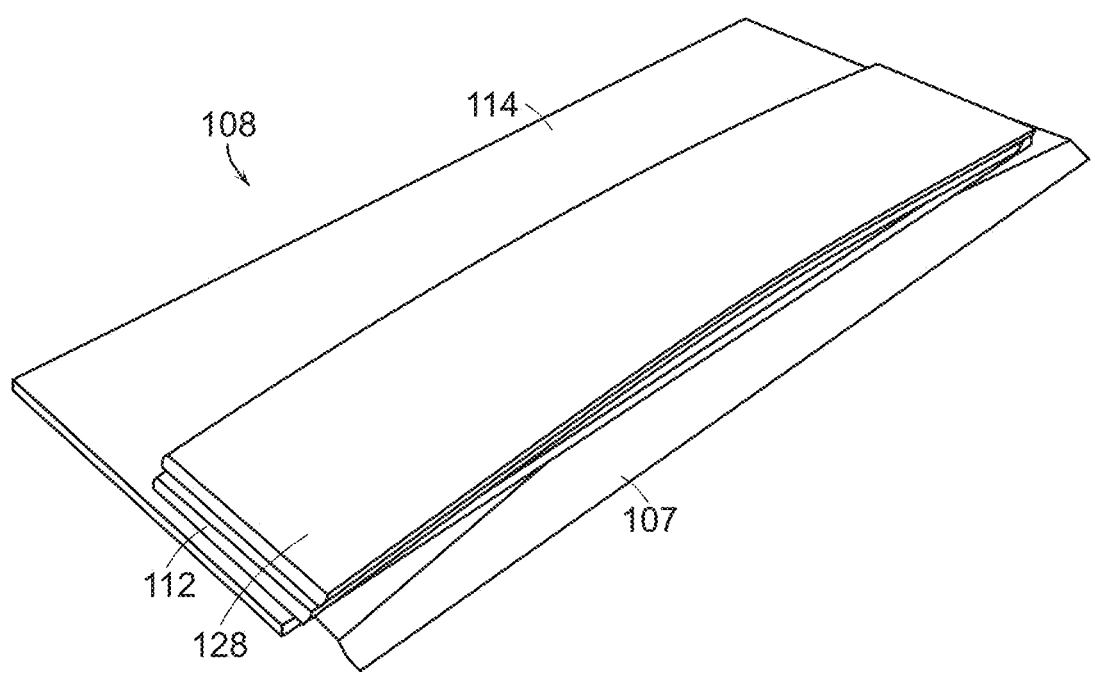
FIG. 2 is a top, front perspective view of a cleaning head according to some embodiments.

In some embodiments, an additional support structure may be provided to attach the cleaning sheet to the collection chamber. For example, a substantially planar support frame may be provided between the collection chamber 112 and the cleaning sheet 114, although the support structure may have other suitable arrangements. In some embodiments, as shown in FIG. 2, for example, the collection chamber 112 may protrude upwardly from the cleaning sheet 114 and/or from the support structure. For purposes herein, the term "protruding upwardly" means that the collection chamber 112 protrudes away from the support structure and/or cleaning sheet, in a direction away from the surface being cleaned.

Figure 4:
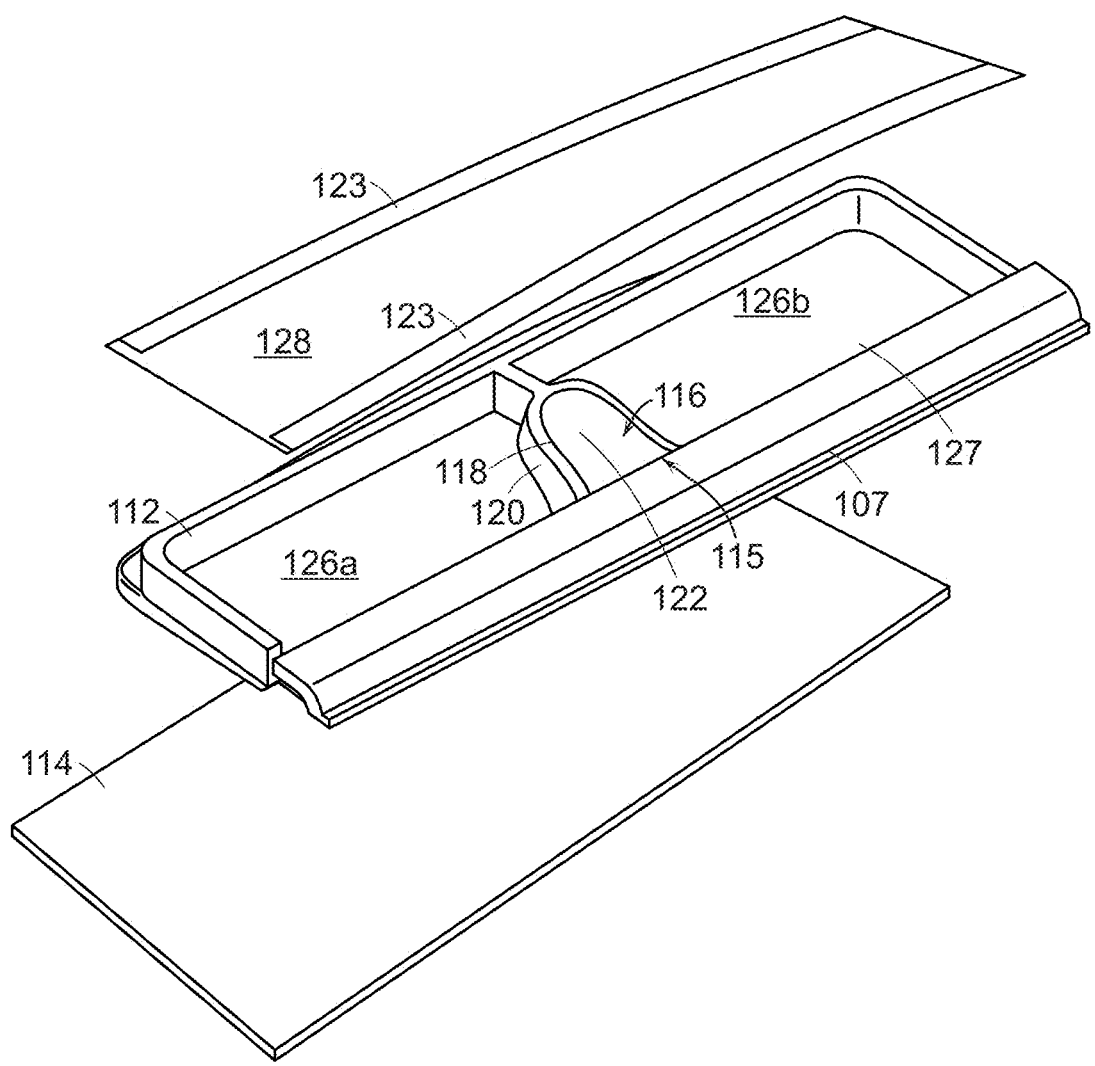
FIG. 4 is an exploded view of the cleaning head of FIG. 2.

In some embodiments, as illustrated in FIG. 4, the collection chamber 112 includes an inlet 115 having an inlet opening 116. In some embodiments, the inlet opening 116 may be located at a top portion of the collection chamber 112. For example, the inlet opening 116 may be formed by a top rim 118 of an upwardly extending wall 120. In some embodiments, the inlet 115 may have a ramp 122 extending from a suction inlet 124 into the collection chamber 112 to aid in moving debris from the suction inlet 124 into collection areas 126a, 126b of the collection chamber 112. Though, in some embodiments, the area below the inlet opening 116 may have a floor that is coplanar with a bottom 127 of the collection areas 126a, 126b of the collection chamber 112.

In some embodiments, a divider 160 may be provided, such as behind the suction inlet to stiffen the collection chamber 112. In such embodiments, the divider may separate the collection chamber into collection areas, as will be described. As will be appreciated, the collection chamber need not include such a divider. In some embodiments, additional walls similar to the divider 160 may be positioned in the collection chamber 112, in some cases to guide air flow within the collection chamber 112.

In some embodiments, an air filter 128 may form a top wall of the collection chamber 112. The filter material may be attached to the collection chamber 112 such that in a first position, as shown in FIG. 2, the air filter 128 covers inlet opening 116. In this position, the air filter 128 inhibits debris that has already been collected in collection areas 126a, 126b from moving over wall 120 and through the inlet opening 116. In some embodiments, the air filter 128 and the collection chamber 112 are arranged such that the air filter 128 is in this first position when negative pressure is not being applied to the air filter 128 (e.g., from the vacuum source).

In some embodiments, when negative pressure is applied to the air filter 128, the air filter 128 moves upwardly (see FIG. 6) and separates from the inlet opening 116. In this second position, debris-entrained air can flow through suction inlet 124, up and over wall 120, and into the debris collection areas 126a, 126b.

Figure 6:
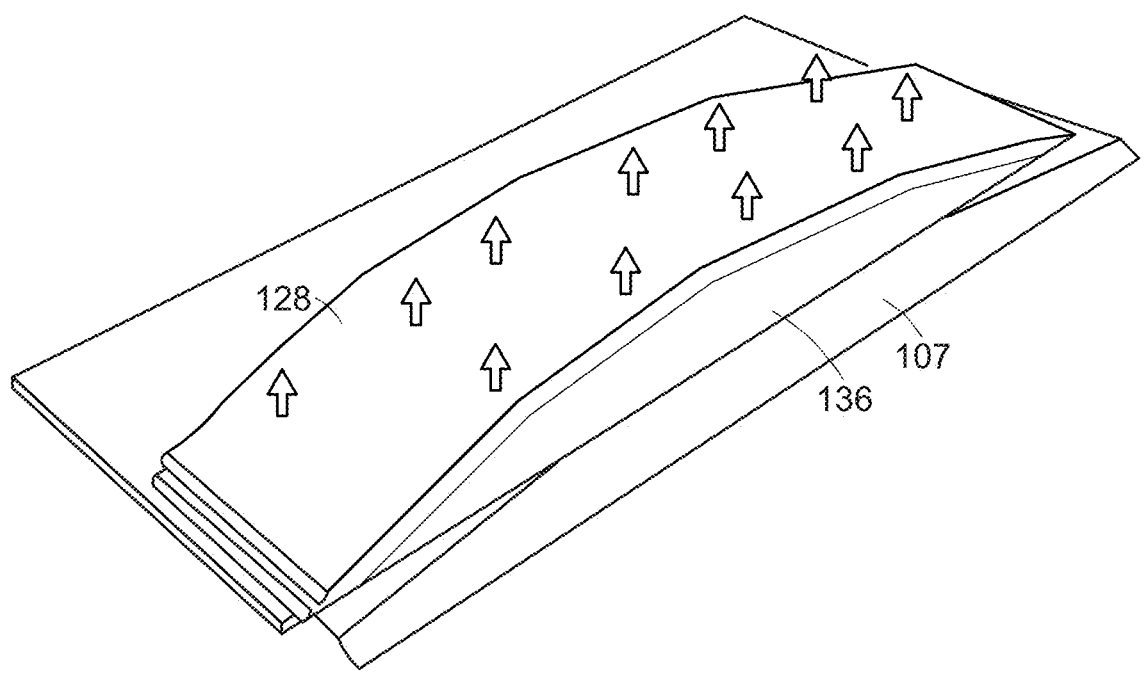
FIG. 6 shows the cleaning head of FIG. 2 in a state where negative pressure is being applied to the collection chamber.

As mentioned above, the air filter 128 may be attached to the collection chamber 112 with an elastic connection. For example, as shown in FIG. 6, an elongated strip 136 of elastic material may connect the air filter 128 to a top portion of the collection chamber 112 along a front wall of the collection chamber 112. A similar elongated elastic strip (not visible in FIG. 6) may connect the air filter 128 to the top portion of the collection chamber 112 along the rear wall of the collection chamber. In such examples, the stretchability of the elongated strips 136 allows the air filter 128 to move away from the inlet opening 116. In some embodiments, elastic connectors also may be used on one or both walls at the lateral sides of the collection chamber 112.

In some embodiments, only a portion of the air filter 128 may rise from the collection chamber 112 when negative pressure is applied to the cleaning head 108. For example, elastic connectors may be provided along only certain portions of the air filter 128. The elastic portions also may be provided in an area of the air inlet opening 116 such that the air filter 128 lifts only in the area at or near the air inlet opening 116, while the remaining areas of the air filter 128 are not substantially lifted.

Figure 7:
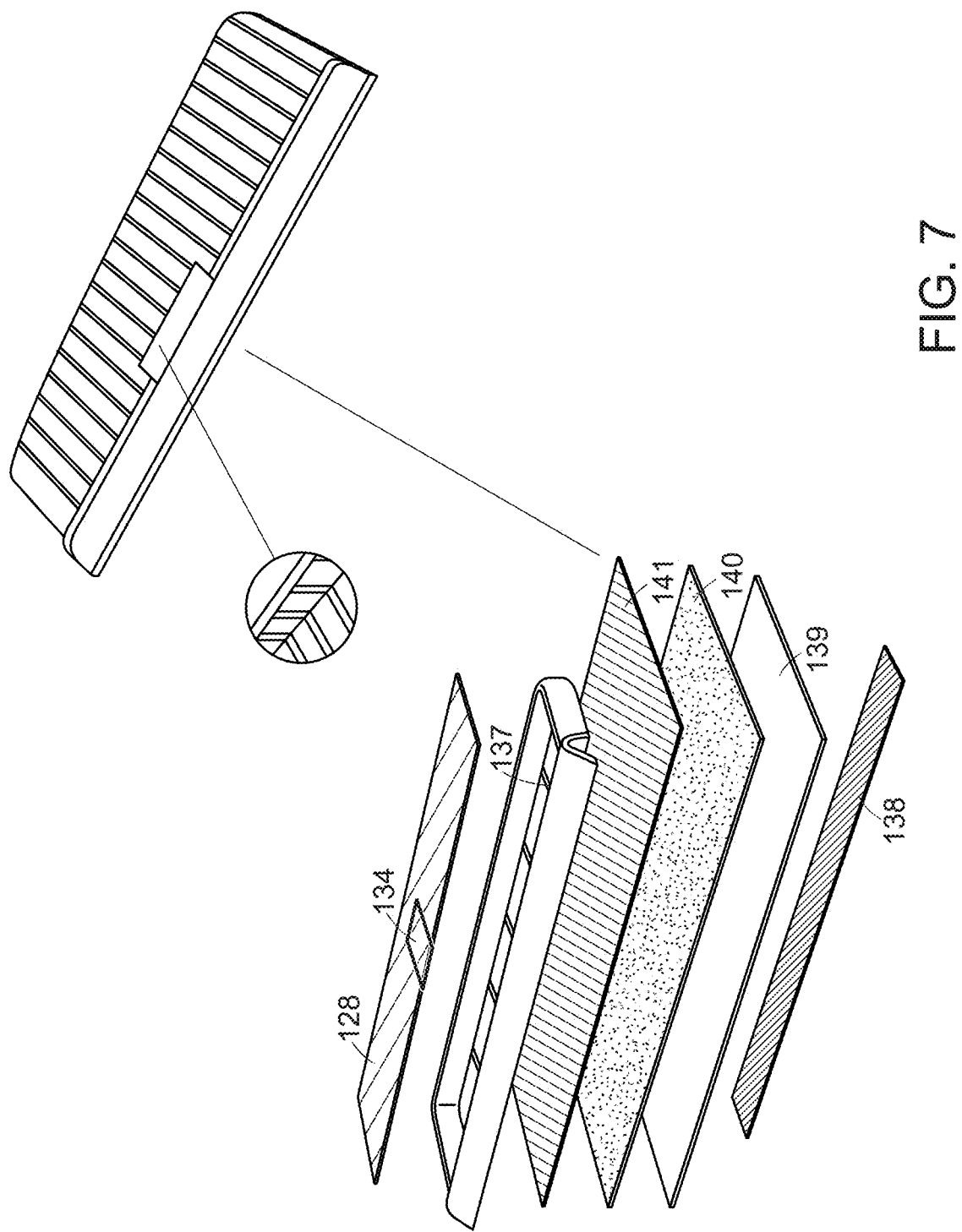
FIG. 7 is an exploded view of a cleaning head and sheet assembly.

In still further embodiments, the air filter 128 may be connected to the collection chamber without any elastic connectors such that the air filter 128 does not move at the connection points. In such an embodiment, the air filter 128 may have a size and shape which allows the air filter 128 to sufficiently lift away from the air inlet opening 116 when under negative pressure such that the cover lifts away from the air inlet opening 116. For example, adhesive strips 123 may be provided on the filter material 128, to secure the filter material to the collection chamber 112, as shown by way of example in FIG. 4. In some embodiments, materials other than an air filter 128 may be used to cover the inlet opening 116. For example, as shown in FIG. 7, a section of air impermeable material may be used in the area of the top wall of the collection chamber 112 as a cover 134 for the inlet opening 116. In some embodiments, the cover 134 may have the same shape as a perimeter of the chamber inlet opening 116, or it may have a different shape. In some embodiments, an underside of cover 134 may be provided with an additional material layer. For example, a layer of material which conforms easily to the rim 118 forming the air inlet may be adhered to an underside of the air filter. Such a layer may act to seal the inlet opening against passage of debris. The cover also may be formed as an additional material layer that is adhered to the underside of an air filter material used to form the top of the collection chamber.

Although the portions of the top wall outside of the cover 134 are shown as being an air filter 128 in the embodiment of FIG. 7, other materials may be used to form the top wall of the collection chamber 112. In some embodiments, the entire top wall may be air impermeable, with one or more air filters being provided elsewhere in the arrangement. For example, the air filter material may be limited to specific sections of the collection chamber.

In some embodiments, a top chamber wall similarly arranged to the air filter 128 shown in FIG. 7 may have air permeable sections only at or near lateral ends of the top chamber wall, with an air impermeable material in the remaining section(s). In other embodiments, air permeable sections may be positioned close to a centered inlet opening 116. Air permeable sections also may be positioned on one or more sides, such as on both sides, of a centered inlet opening 116. As will be appreciated, one or more inlet opening may be formed in any suitable portion of the collection chamber, with air permeable material in corresponding locations on the top of the collection chamber. In some embodiments, a collection chamber 112 may include more than one inlet opening 116 and a cover for each of the openings.

In some embodiments, as also shown in FIG. 7, for example, the collection chamber 112 may include stiffening ridges 137 along a bottom of the collection chamber 112. In some embodiments, the stiffening ridges 137 may allow for less material to be used in forming the collection chamber 112. In some embodiments, the stiffening ridges 137 may extend between the front and back of the collection chamber, as is shown. As will be appreciated, stiffening ridges may be positioned and sized in any suitable manner. For example, stiffening ridges may extend only part way between the front and back of the collection chamber. Stiffening ridges also may extend at least part way between the lateral sides of the collection chamber, or between the sides of the collection chambers. The stiffening ridges may extend substantially perpendicular to a suction nozzle of the cleaning head, although they instead may be angled relative to the suction nozzle. The shape and size of each of the stiffening ridges may be the same as one another, though the shape and size may vary from ridge to ridge.

Stiffening ribs or grooves also may be used instead of, or in addition to, stiffening ridges. In some embodiments, the same material used to forming the collection chamber 112 may be used to form the stiffening ribs or grooves. In such embodiments, a different material may be used to form the stiffening ridges.

In some embodiments, the collection chamber 112 may be formed via a plastic thermoforming process, although collection chamber 112 may be manufactured using any suitable process. For example, the collection chamber 112 may be injection molded or compression molded. In some embodiments, the collection chamber 112, the suction nozzle 107, and the suction inlet 115 may be formed as a unitary piece. In some embodiments, the collection chamber 112, the suction nozzle 107, and the inlet 115 may be integrally formed, such as by thermoforming. In other embodiments, one or more of the collection chamber 112, the suction nozzle 107, and the suction inlet 115 may be separately formed and later attached to one another. For example, the suction nozzle and suction inlet may be integrally formed, with the collection chamber being separately formed and later attached.

As mentioned above, a cleaning sheet 114 may be attached to the collection chamber 112. The cleaning sheet 114 may be formed of any suitable material, and may be made of a single layer or multiple layers. In the embodiment shown in FIG. 7, the cleaning sheet 114 may include multiple layers such as a multifunctional strip 138, a face layer 139, and first and second absorbent layers 140 and 141. The face layer 139 and absorbent layers 140, 141 may be made from various non-woven materials, woven materials, and/or plastics, or any other suitable materials. The absorbent layers 140, 141 may be configured to wick moisture away from the face layer 139. The multifunctional strip 138 may be used for scrubbing in some embodiments. In some embodiments, the multifunctional strip 138 may provide friction to help prevent the cleaning device 100 from slipping when propped against a wall.

Figure 8:
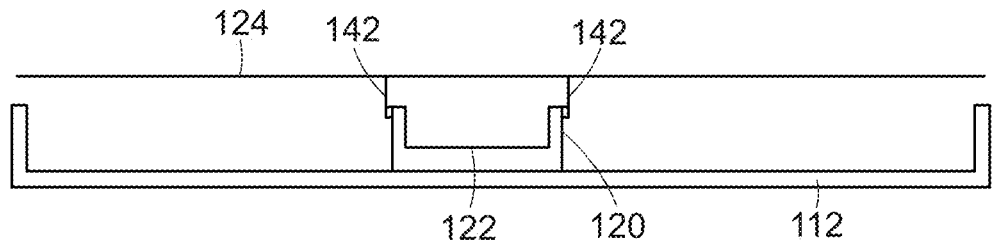
FIG. 8 is a cross-sectional front view of a cleaning head and a partially lifted top chamber wall according to some embodiments.
Figure 9:
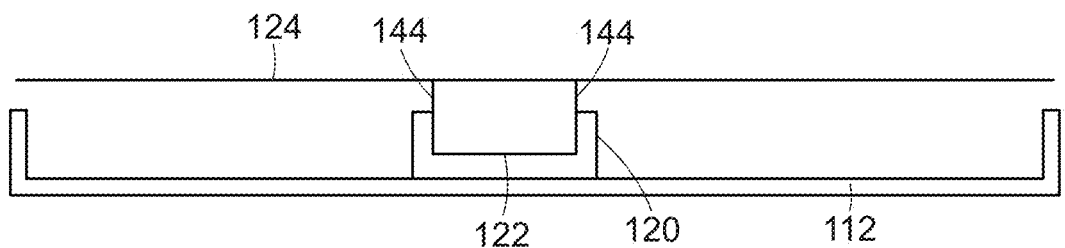
FIG. 9 is a cross-sectional front view of a cleaning head and a partially lifted top chamber wall according to alternative embodiments.

As described above, and as shown in FIG. 7, a cover 134 may be used to cover the inlet opening 116 of the collection chamber. In some embodiments, as shown in FIGS. 8 and 9, the cover may include one or more portions which extend downwardly into the inlet opening 116 and/or around the outside of the inlet opening 116. For example, a collar may be attached to an underside of the air filter 128 such that when the vacuum is turned off (e.g., the negative pressure applied the air filter is released) and the air filter 128 returns to a home position, (see FIGS. 8 and 9), the collar covers some or all of the perimeter of the inlet opening 116.

As will be appreciated, in the home position, the air filter is no longer subject to negative pressure and, thus, moves in a direction toward the collection chamber. In some embodiments, the home positon is the same as the first position described above, with the air filter and/or cover being placed and/or held against the inlet opening to block debris from exiting the collection chamber. In other embodiments, in the home position, the air filter and/or cover may be at least partially spaced from a top surface of the inlet opening, although the air filter may contact or be attached to other portions of the collection chambers. As will be appreciated, even though the air filter and/or cover may be at least partially spaced from a top surface of the inlet opening, the inlet opening may still be closed such that debris may not escape when the vacuum is turned off. For example, as will be described, the air filter and/or cover, along with the portions that extend into and/or around the outside of the inlet opening, may cooperate to close the inlet opening when the cleaning device is in the off position.

In some embodiments, a collar 142 may be connected to an underside of the air filter 124, as shown in FIG. 8. When the air filter 124 is moved to the home position, the collar 142 may be positioned next to, and/or in contact with, an outside portion of wall 120. As shown in this view, air filter 124 is shown slightly higher than the inlet opening when the filter is in the home position of FIG. 8. In some embodiments, the collar 142 may be made of a rigid material, although the collar may be made of a flexible material.

Referring to FIG. 9, in some embodiments, a downwardly extending member may be positioned inside the inlet opening 116 when the air filter 124 is in the home position. In such embodiments, a collar 144 is adapted to be positioned next or in contact with an inside portion of wall 120. As with the embodiment illustrated in FIG. 8, the collar 144 may be made of a rigid material or a flexible material.

As will be appreciated, the downwardly extending cover structures shown in FIGS. 8 and 9 may be used in addition to or instead of a substantially horizontal cover portion of the air filter 124.

Figure 10:
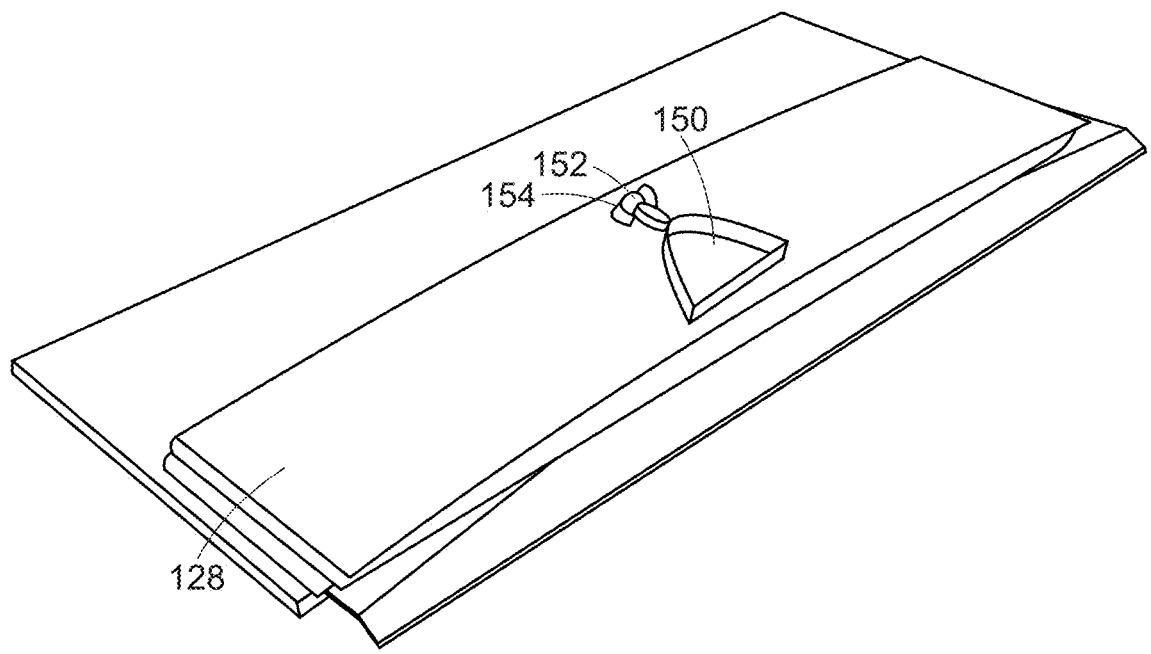
FIG. 10 is a perspective view of a cleaning head with a cover stabilizer according to some embodiments.

In some embodiments, a cover stabilizer may be implemented to help maintain contact between the cover and a rim of the inlet opening 116. For example, as shown in FIG. 10, a cover stabilizer 150 may be used with a similar shape to the rim 118 of the outlet opening shown in FIGS. 4 and 5. In some embodiments, the stabilizer 150 is pivotally attached to the air filter 124, 128 at a pivot joint 152, and is biased downwardly by a torsion spring 154. In other embodiments, the stabilizer may be formed with or otherwise attached to the first connector 106A. The force applied by the stabilizer 150 may press the underside of air filter 124, 128 to secure contact with the rim 118 of the air inlet opening. The weight of the stabilizer 150 and the strength of the torsion spring 154 may be configured such that when the air filter 124, 128 is lifted from the collection chamber 112, the stabilizer 150 does not overly deform the shape of the air filter 124, 128. In some embodiments, a mechanical limit to the rotation of the stabilizer 150 may be implemented, for example at the pivot joint 152.

A conduit end does not have to be fully exposed to be considered to be an inlet opening 116 that is not covered by a cover. For example, if the air inlet opening 116 for a debris collection chamber 112 is formed by an upright cylindrical column with a top circular rim, and the air filter 128 is removed from a sufficient portion of the circular rim during vacuuming to permit flow of air and debris into the collection chamber 112, the air inlet opening 116 may be considered to be not covered by the air inlet opening cover.

Figure 11:
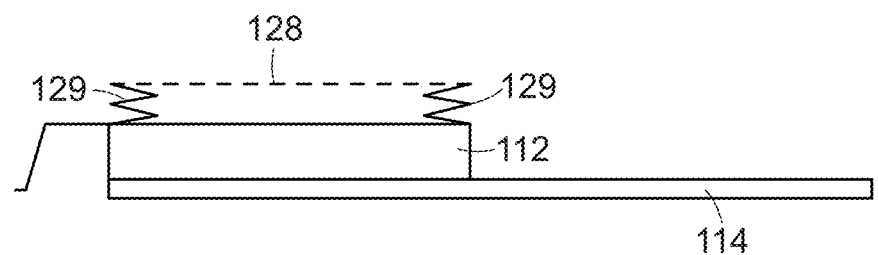
FIG. 11 is a cross-sectional side view of a cleaning head with a chamber inlet cover an arrangement according to some embodiments.
Figure 12:
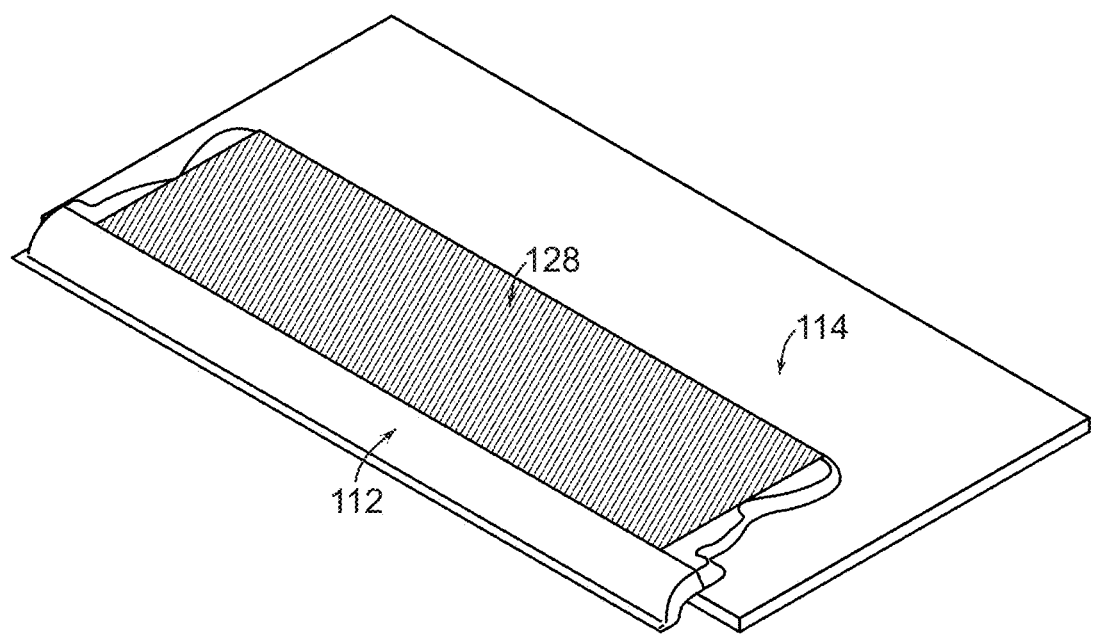
FIG. 12 is a top, front perspective view of a cleaning head according to some embodiments.

As mentioned above, the air filter 128 (or other collection chamber wall) may be connected to the collection chamber 112 without any elastic connectors. FIG. 11 shows one embodiment where the air filter 128 is attached to the collection chamber with a pleated material 129. The air filter 128 is shown slightly lifted from the collection chamber in FIG. 11. In some embodiments, when negative pressure is applied to the air filter 128, the air filter 128 pulls on and unfolds the pleats. In some embodiments, the pleats may be biased toward the folded position, such that when the negative pressure is released, the pleats may return toward the folded position such that the air filter 128 covers the chamber inlet opening 116. In some embodiments, a cover stabilizer, such as the stabilizer 150 shown in FIG. 10, may be used in conjunction with a pleated arrangement or other non-elastic arrangement.

Instead of, or in addition to, using air filter 128 as the top wall of the collection chamber 112, the pleated material 129 may be formed of an air filter material. For example, the top wall may be formed of an air impermeable material, and the vacuum cleaner may be configured to encompass at least the top wall and the pleated sides 129. When negative pressure is applied, the top wall may be lifted upwardly and away from the inlet open, exposing the air filter material of the pleated sides 129. Air may then be withdrawn from the collection chamber 112 via the pleated sides 129.

Figure 5:
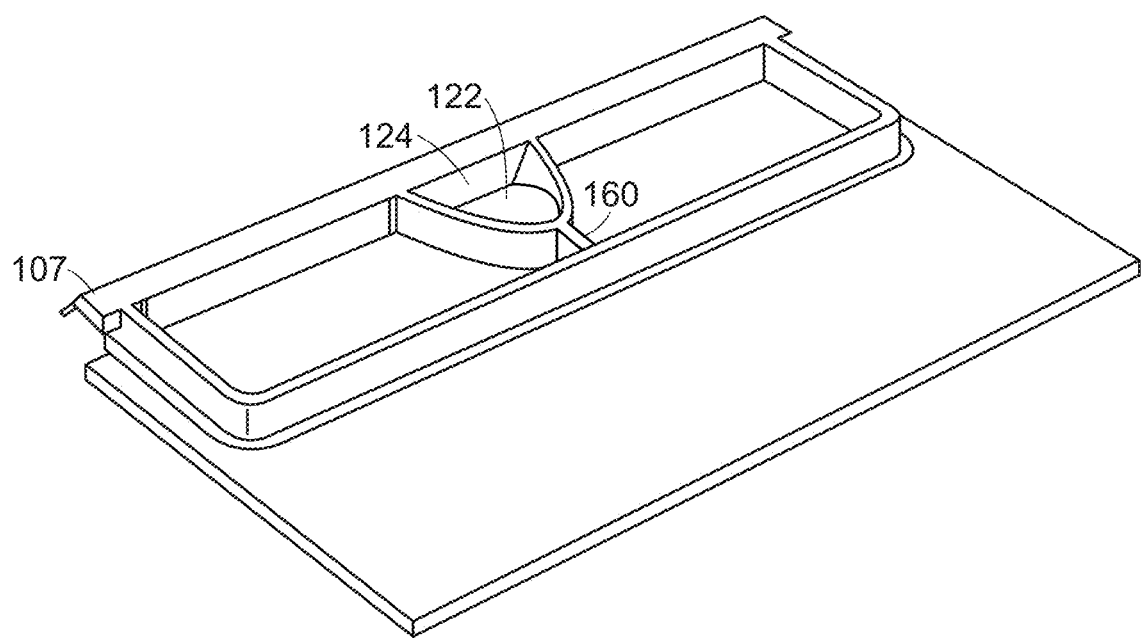
FIG. 5 is a top, rear perspective view of the cleaning head of FIG. 2 with the air filter shown removed.

While the embodiments illustrated herein show the inlet opening facing upward and the air filter 128 positioned such that the air filter 128 acts as a top wall of the collection chamber 112, the air filter 128 may be positioned elsewhere on the collection chamber 112 and still function as a removable cover for the chamber inlet opening 116. For example, instead of facing upwardly as shown in FIGS. 4 and 5, the chamber inlet opening 116 may face rearwardly, and the air filter 128 may be positioned at the back of the collection chamber 112. In the home position, the air filter 128 may be held against the chamber inlet opening 116, for example with elastic connectors, to cover the inlet opening 116. When negative pressure is applied, the air filter 128 be moved away from the chamber inlet opening 116.

Although embodiments have been shown and described with only the top wall of the collection chamber moving in response to negative pressure, in some embodiments, more than one wall of the collection chamber 112 may move in response to negative pressure. For example, in some embodiments, a top wall and one or more side walls of the collection chamber may move in response to an applied pressure. In some embodiments, a movable wall may include a flexible bag structure. As will be appreciated, in some embodiments, the entire debris collection chamber 112 may be formed as a flexible bag attached to the chamber inlet opening 116. In some embodiments, a portion of the bag may be positioned against the chamber inlet opening 116 when no negative pressure is applied. In such embodiments, the bag may expand from the application of negative pressure such that the portion of the bag covering the chamber inlet opening 116 moves away to allow debris-entrained air to enter the bag. As described herein, walls may be planar and/or rigid in some embodiments, although the walls, or at least a portion of the walls may be flexible in other embodiments such that the collection chambers 112 may have a combination of rigid and flexible walls.

For purposes herein, applying a negative pressure to a collection chamber 112 may include applying a negative pressure to the outside of an air permeable portion of the chamber 112 and/or applying a negative pressure to an opening in the collection chamber 112.

Figure 13:
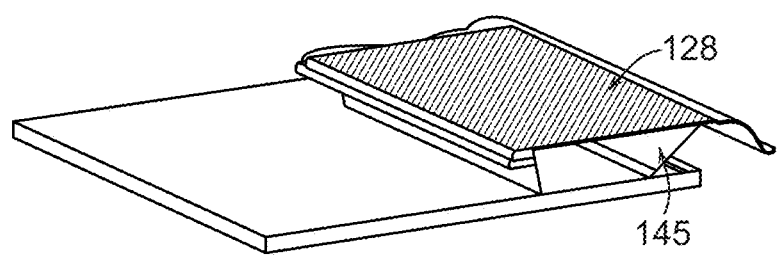
FIG. 13 is a cutaway view of the cleaning head of FIG. 12.
Figure 14:
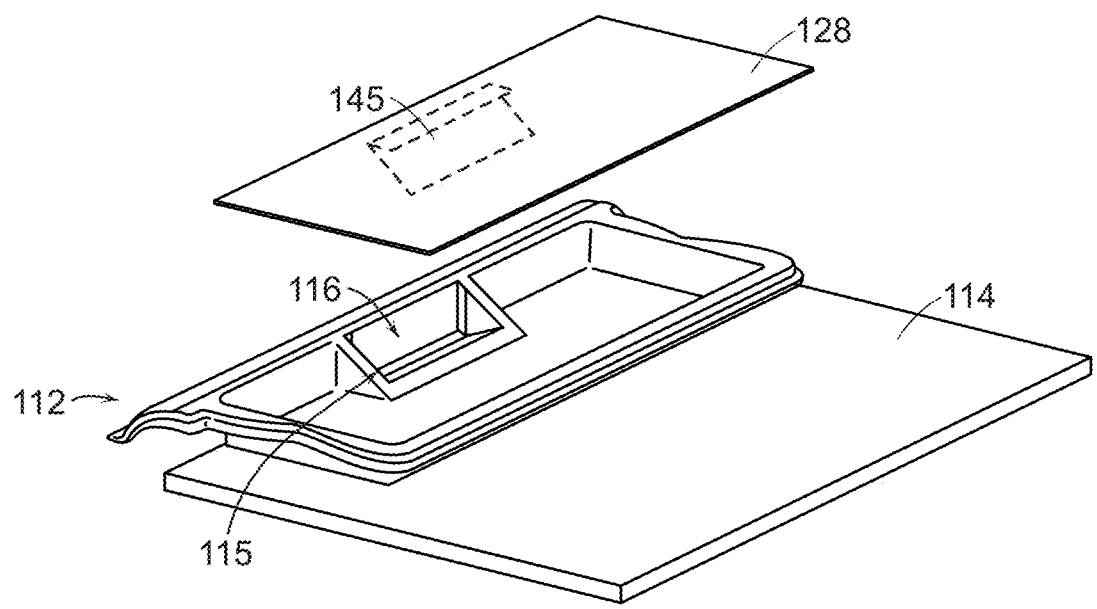
FIG. 14 is a partially exploded view of the cleaning head of FIG. 12.
Figure 15:
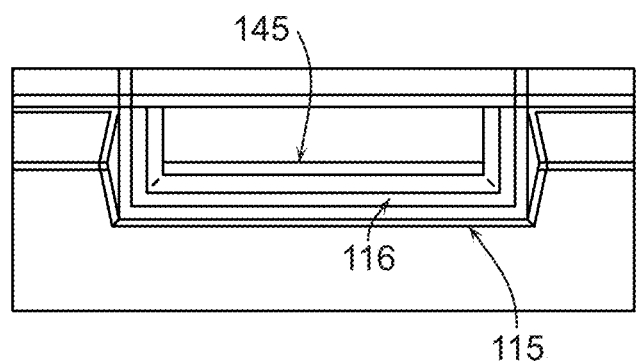
FIG. 15 is an enlarged view of an inlet of the cleaning head of FIG. 12.
Figure 16:
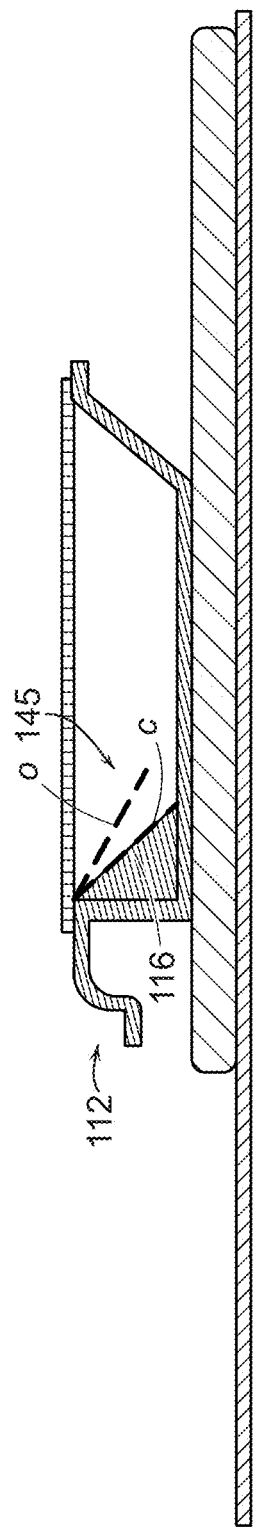
FIG. 16 is a schematic cross-sectional side view of the cleaning head of FIG. 12 showing a valve in a closed position and an opened position.
Figure 17:
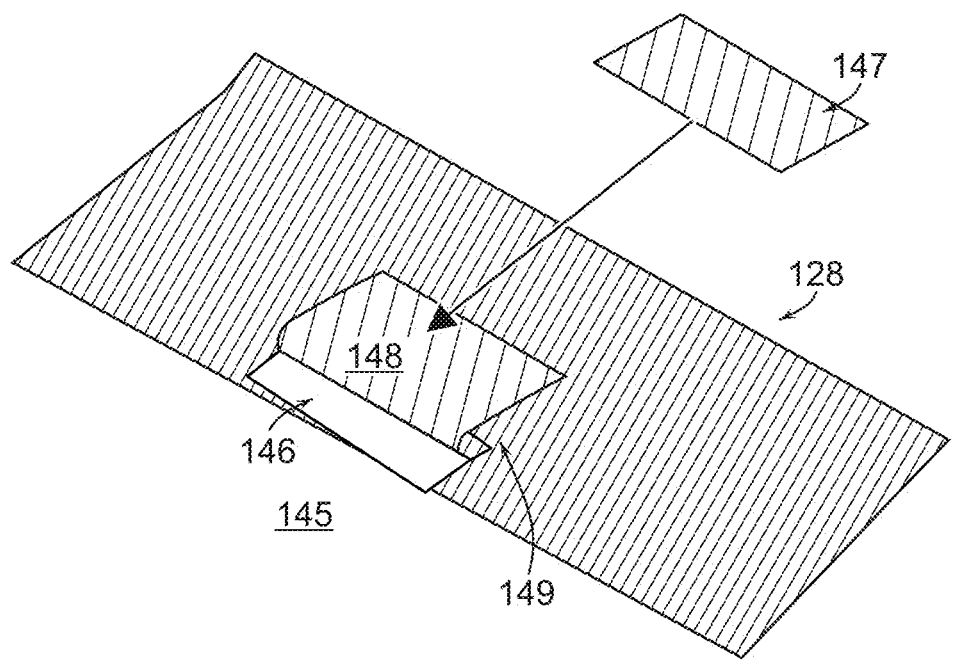
FIG. 17 is a partially exploded view of an air filter of the cleaning head of FIG. 12 according to some embodiments.
Figure 20:
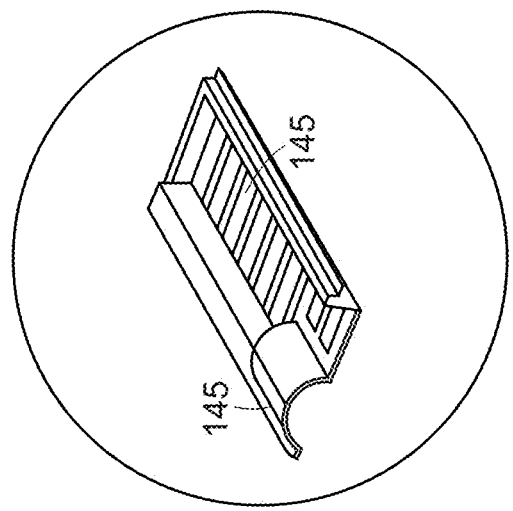
FIG. 20 is a cutaway view of a collection chamber and suction nozzle of the cleaning head of FIG. 12.
Figure 19:
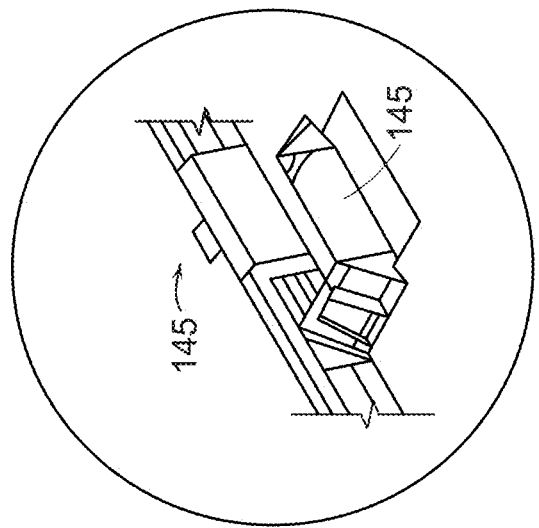
FIG. 19 is an enlarged view of an inlet opening and an inlet valve of the cleaning head of FIG. 12.
Figure 18:
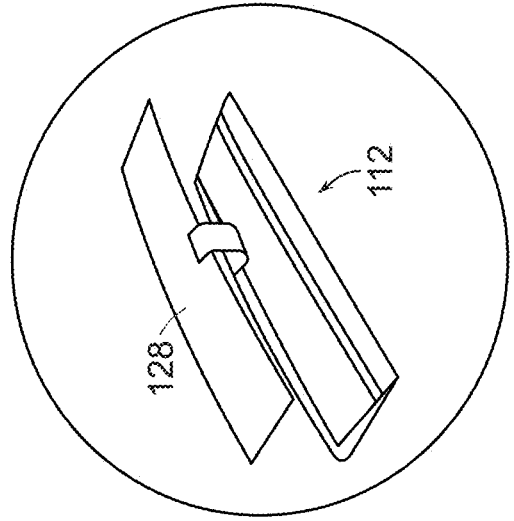
FIG. 18 shows the cleaning head of FIG. 12 with an air filter removed from the cleaning head.
Figure 21:
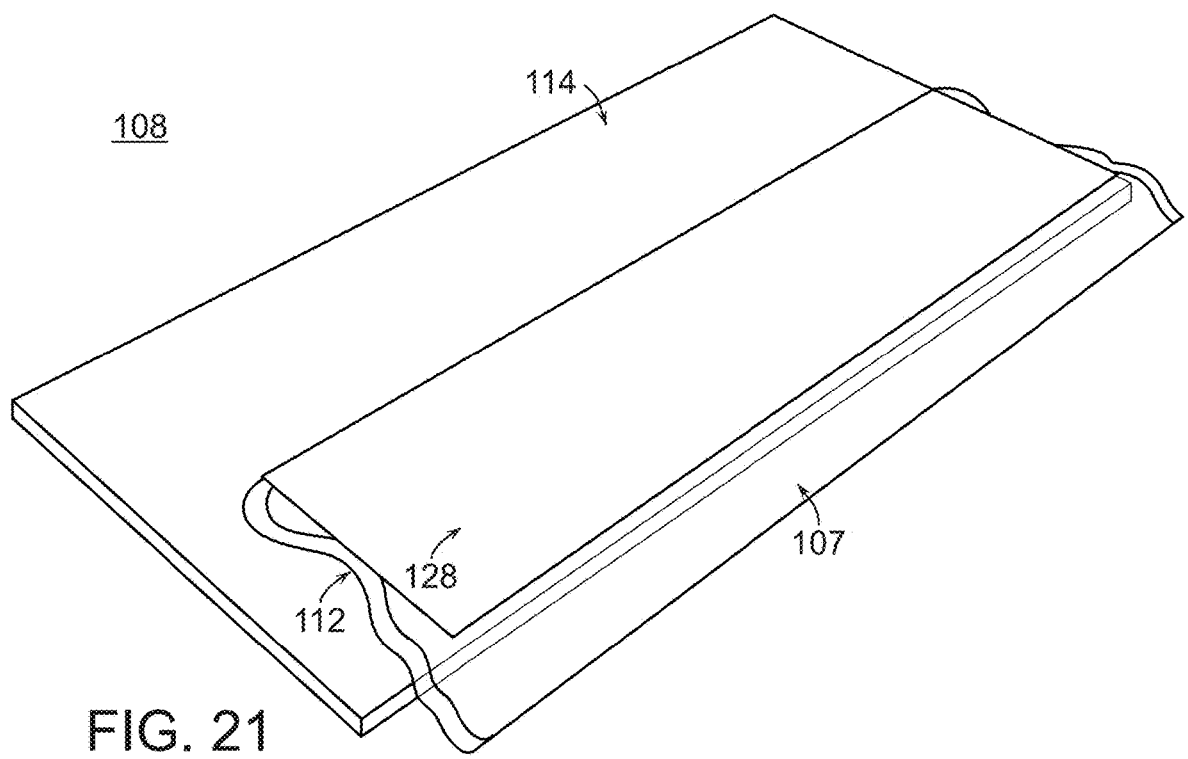
FIGS. 21 and 22 show a top, front perspective view of a cleaning head and a bottom, rear perspective view of the cleaning head, respectively, according to some embodiments.
Figure 22:
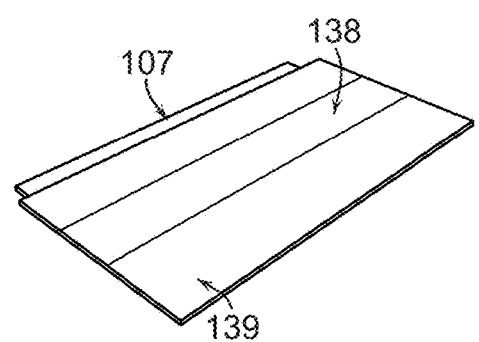
Figure 23:
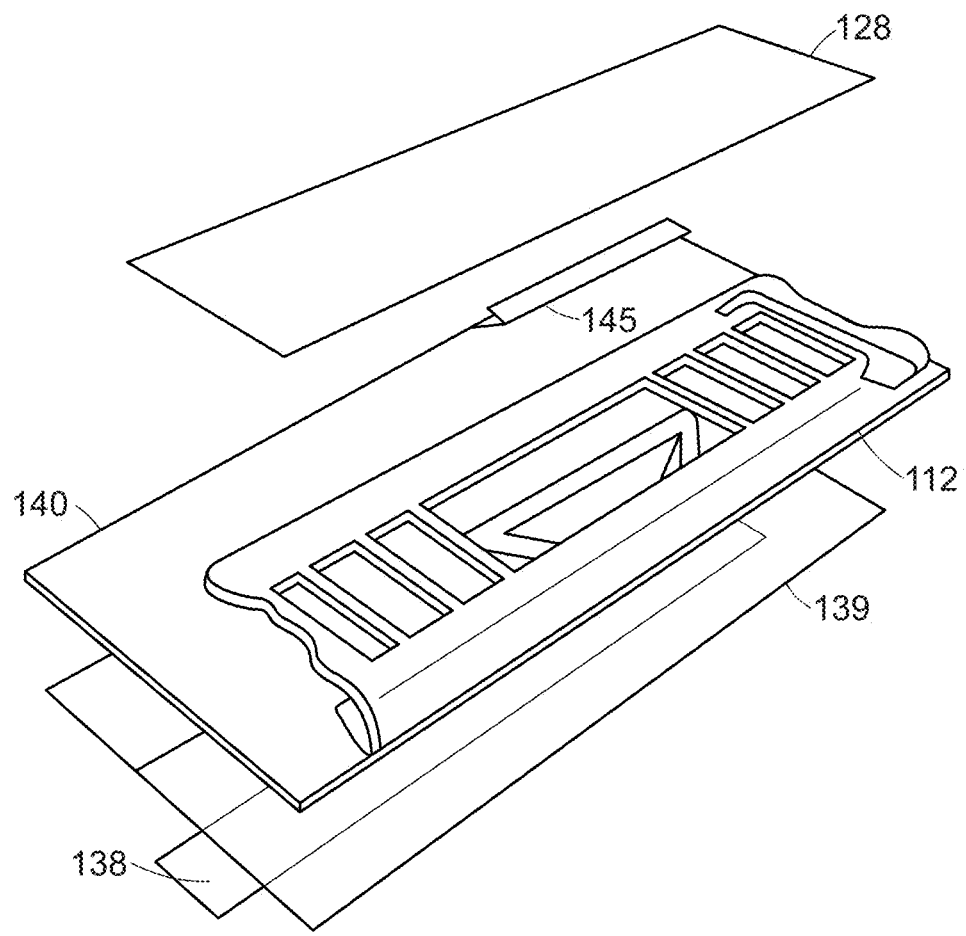
FIG. 23 is an exploded view of the cleaning head of FIG. 21.

In some embodiments, such as those shown in FIGS. 12-15, the collection chamber 112 may include a lip and internal valve 145 that keeps dust, dry media, and/or wet media within the collection chamber 112 once the dirt has been moved into the chamber, thereby preventing dust and dry media from exiting via the chamber inlet opening 116 of the inlet 115, such as when the vacuum is powered off. In some embodiments, as shown in FIGS. 13-15, the internal valve 145 of the collection chamber 112 may be selectively openable and closeable at or near the chamber inlet opening 116. For example, as shown in FIG. 16, the internal valve 145 may be pivotable between an open position O when the vacuum is turned on and a closed position C when the cleaning device 100 is turned off.

In some embodiments, as shown in FIGS. 13-15 and 17-20, the internal valve 145 may be integrally or attachably formed with at least a portion of the cleaning head 108. For example, the internal valve 145 may be integrally formed with or protrude from a top rim 118 of an upwardly extending wall 120 that forms a perimeter of the collection chamber 112. The internal valve 145 also may protrude downwardly from the top rim 118 of the upwardly extending wall 120 to block or otherwise obscure the chamber inlet opening 116 when, for example, the vacuum is powered off. In other embodiments, the internal valve 145 may be attachably received at, an elongated strip or other portion of the air filter 128. In some embodiments, the elongated strip may be at least partially formed by the air filter 128 or may be attachably received at the air filter and, in some embodiments, protrude downwardly from the air filter 128. For purposes herein, the term "protrudes downwardly" means that the internal valve 145 and/or elongated strip protrudes away from the air filter 128 in a direction toward the surface being cleaned.

Referring to FIGS. 17-20, in some embodiments, the internal valve 145 may be permanently or removably attached to the top rim 118 of the upwardly extending wall 120, the elongated strip, and/or at least a portion of the air filter 128. For example, the internal valve 145 may be glued, heat sealed, or otherwise permanently affixed to the top rim 118, the elongated strip, and/or the air filter 128. In some embodiments, the internal valve 145 may include or be formed of one or more flaps 146, 147, 148. In some embodiments, the one or more flaps may include the elongated strip or at least a portion of the air filter 128. In some embodiments, the flaps 146, 147, 148 together aid in moving debris from the suction inlet 107 of the cleaning head 108 into the collection areas 126a, 126b of the collection chamber 112 and inhibit debris that has already been collected in collection areas 126a, 126b from moving over wall 120 (see FIG. 3) and through the inlet opening 116 of inlet 115.

The internal valve 145 and/or the one or more flaps 146, 147, 148 may be formed of any suitable material, and may be made of a single layer or multiple layers of, for example, non-woven materials, woven materials, and/or plastics, or any other suitable materials. The one or more flaps 146, 147, 148 may be glued, heat sealed, or otherwise permanently affixed to each other 146, 147, 148, the top rim 118, the elongated strip, and/or the air filter to form the internal valve 145. For example, in some embodiments, the internal valve 145 may be formed of multiple layers including a first layer made of a lightweight, non-woven material 146, 148 and at least a second layer made of a stiff, non-porous material 147. An adhesive strip may be provided on the filter material of the air filter 128 or elongated strip 146 protruding downwardly from the filter material 128 to secure the internal valve 145 to the air filter 128. In some embodiments, during a manufacturing process, the first layer 146, 148 of the internal valve 145 may be heat sealed or otherwise adhered to the adhesive strip provided on the filter material or elongated strip 146 of the air filter 128. A single fold or pleat 149 may be made in the first layer 146, 148 causing a first side of the first layer 146, 148 to move in a first direction toward the air filter 128 during the manufacturing process. The second layer 147 may be heat sealed or otherwise adhered to a second side opposite the first side of the first layer 146, 148.

In some embodiments, when a negative pressure is applied to or released from the air filter 128, the negative pressure via the air filter 128 may pull on or release the internal valve 145 causing the internal valve 145 to pivot at the single fold or pleat 149 (see FIG. 17) between an open position when the vacuum is turned on and a closed position when the cleaning device 100 is turned off. As shown in FIG. 16, in the closed position C, the internal valve 145 may be fully sealed against the chamber inlet opening 116 of inlet 115 of the collection chamber 112. For example, as shown in FIG. 15, a frame portion may extend along a perimeter edge of the chamber inlet opening 116 of inlet 115 and be positioned 2±0.5 mm from the perimeter edge of the chamber inlet opening 116. In the closed position C, when the cleaning device 100 is turned off, the internal valve 145 may rest on the frame portion such that the internal valve 145 is fully sealed against the chamber inlet opening 116 of inlet 115.

In some embodiments, as shown in FIGS. 21-23 and 24A-F and as noted above, the cleaning sheet 114 may be attached to the collection chamber 112 and be positioned behind the suction nozzle 107 such that debris may be suctioned into the nozzle 107 and collection chamber 112 before the cleaning sheet 114 reaches the debris. In the embodiment illustrated in FIGS. 22 and 23, the cleaning sheet 114 includes multiple layers including a multifunctional strip 138, a face layer 139, and first and second absorbent layers 140 and 141. The face layer and absorbent layers may be made from various non-woven materials, woven materials, and/or plastics, or any other suitable materials. The absorbent layers may be configured to wick moisture away from the face layer. The multifunctional strip 138 may be used for scrubbing in some embodiments. In some embodiments, the multifunctional strip 138 may provide friction to help prevent the cleaning device from slipping when propped against a wall. In some embodiments, the debris collection chamber 112 may be permanently or removably attached to the cleaning sheet 114.

Figure 24A:
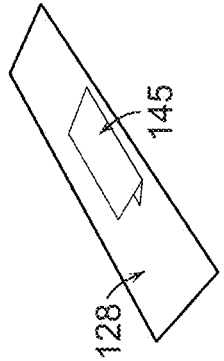
FIGS. 24A-24F shows a manufacturing process of the cleaning head of FIGS. 12 and 21.
Figure 24B:
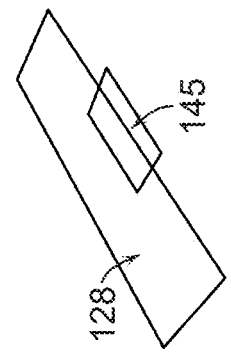
Figure 24C:
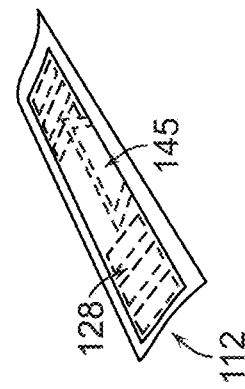
Figure 24D:
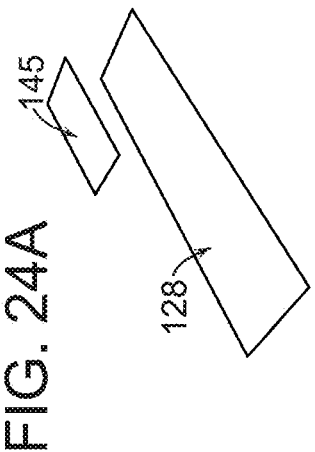
Figure 24E:
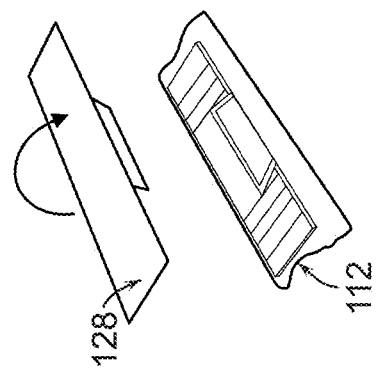
Figure 24F:
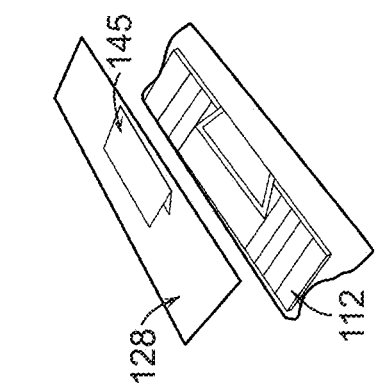

Referring to FIGS. 17 and 24A-F, in some embodiments, the air filter 128 may include a first side and a second side. An adhesive strip may be provided on the first side of the air filter 128 or on an elongated strip 146 protruding downwardly from the first side of the air filter. During a manufacturing process, as shown in FIG. 24A-24C, the internal valve 145 may be removably or fixedly secured to the air filter 128 at the first side of the air filter 128. After the internal valve 145 is secured to the first side of the air filter 128, the air filter 128 may be rotated or flipped to a second side, as shown in FIG. 24E, such that the first side of the air filter 128 faces a top side of the dirt collection chamber 112. The first side of the air filter 128 may be glued, heat sealed, or otherwise permanently affixed to the top side, including the top rim 118, of the dirt collection chamber 112, as shown in FIG. 24F. As described above, the internal valve 145 may be arranged pivot at the single fold or pleat 149 between an open position when the vacuum is turned on and a closed position C (see, e.g., FIG. 16) when the cleaning device 100 is turned off.

In some embodiments, when the cleaning head 108 is attached to the cleaning device 100, at least a portion of the debris collection chamber 112 may be covered by the cleaning device 100. For example, in some embodiments, the debris collection chamber 112 may be covered by the first connector 106 used to connect the cleaning head 108 to the cleaning device 100.

As described above, the cleaning head 108 may be attachable to the first connector 106 of the cleaning device via a corresponding second connector on the cleaning head. As shown in FIG. 25, in some embodiments, the first connector 106 includes an engagement element 170 that engages with a corresponding engagement element or portion 171 of the cleaning head 108 (see FIG. 26). For example, in the embodiments illustrated in FIGS. 25-27, the engagement element 170 may include clip portions that selectively engage and disengage an undercut bump, lip feature, or other recess 171 formed in a side wall 120 of the debris collection chamber 112. In some embodiments, the undercut bump 171 may include a V-shaped feature used to align and hold the cleaning head 108 and cleaning sheet 114 relative to the first connector 106. In some embodiments, clip portions of the engagement element 170 may be moveable between an engaged position (e.g., into engagement with the undercut bump 171) and a released position (e.g., out of engagement with the undercut bump 171). In some embodiments, the engagement element(s) 170 may be separately movable between the released and engaged positions. In other embodiments, the engagement element(s) 170 move simultaneously between the engaged and released positions. As will be appreciated, the engagement element(s) 170 may be biased toward the engaged position such that when the user releases an actuator, the clip portions of the engagement element(s) 170 engage with a corresponding undercut bump, lip feature, or other recess formed on an engagement element 171 of the cleaning head 108.

In some embodiments, once the cleaning sheet has been attached to the cleaning device, such as via the first and second connectors, the user may operate a vacuum or suction source to clean a surface. In some embodiments, the vacuum cleaner 100 may include one or more actuators for actuating the suction source. As described above, upon actuation of the suction source, at least a portion of the air filter may move away from the inlet opening to allow debris entrained air to enter into the collection chambers. The suction source may be an electric motor in some embodiments. In some embodiments, the cleaning device also may include one or more actuators for actuating liquid application. For example, the user may actuate the one or more liquid applicators to apply a cleaning solution to the surface to be cleaned. As will be appreciated, the user may actuate the liquid actuators at the same time that the vacuum source is being applied to the surface, although the user may actuate the suction source before and/or after actuating the liquid applicators.

Cleaning heads 108 described herein may be constructed and arranged to permit efficient packing in some embodiments. For example, as shown in FIG. 28, the debris collection chamber 112 and suction nozzle 107 may be sized and positioned on a cleaning sheet 114 and/or support structure such that an inverted cleaning head 108 is stackable on an upright cleaning head in such a manner that the upwardly-facing surface is substantially level. As can be seen in this view, eight cleaning heads 108 are stackable, with the cleaning heads alternating between an upright position and an inverted position. In some embodiments, the suction nozzles 107 are sized and position so as to not interfere with the adjacently stacked cleaning heads. In other embodiments, the engagement elements 171 may be sized and positioned such that multiple cleaning heads 108 are stackable in such a manner as to reduce an overall stack height.

Figure 29:
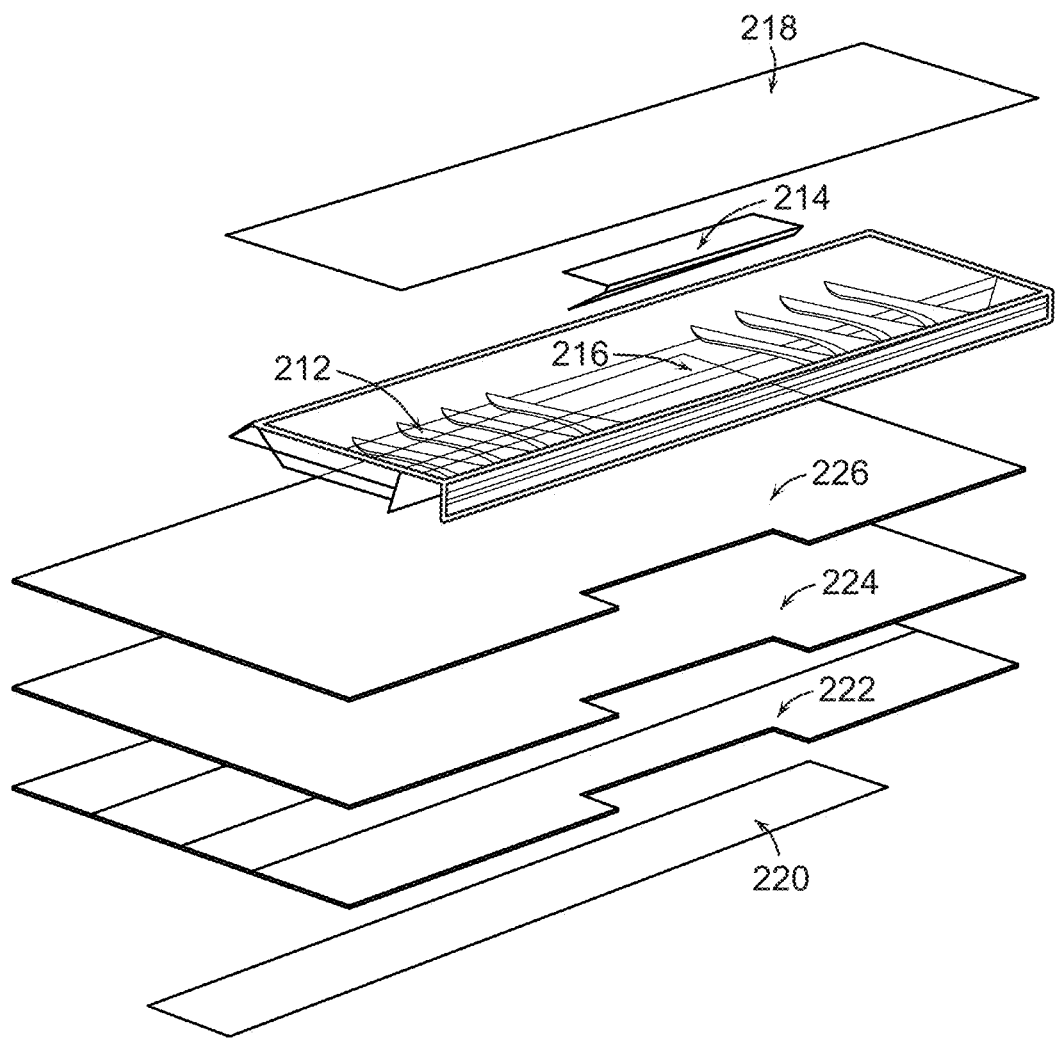
FIG. 29 is an exploded view of a cleaning head and sheet assembly according to a further embodiment.

An alternative embodiment of a cleaning head with an attached cleaning sheet is shown in FIG. 29. As shown in this view, the cleaning head may include a debris collection chamber 212 and a non-return valve 214. As with the above, the non-return valve may be arranged to keep dust, dry media, and/or wet media within the debris collection chamber once the dirt has been moved into the chamber, such that dust and dry media may be prevented from exiting via the chamber inlet opening of the inlet, such as when the cleaning device is powered off. In some embodiments, the debris collection chamber may be formed as part of a tray 216, which may be constructed of a thermoformed plastic in some embodiments. In some embodiments, the non-return valve 214 opens when the suction is turned on, and returns to a closed position when the suction is turned off. In some embodiments, the non-return valve may be formed of a polypropylene.

An air filter 218 covers the debris collection chamber 212 in some embodiments. The air filter may be made with a hydrophobic material to impede liquid penetration. In some embodiments, the filter may be made of a polypropylene.

A cleaning sheet may be attached to the underside of the tray in some embodiments. The cleaning sheet may include one or more layers. For example, in the illustrated embodiment, a multifunctional strip 220 is attached to a face layer 222, which is backed by an acquisition layer 224 and a retention layer 226.

Figure 31:
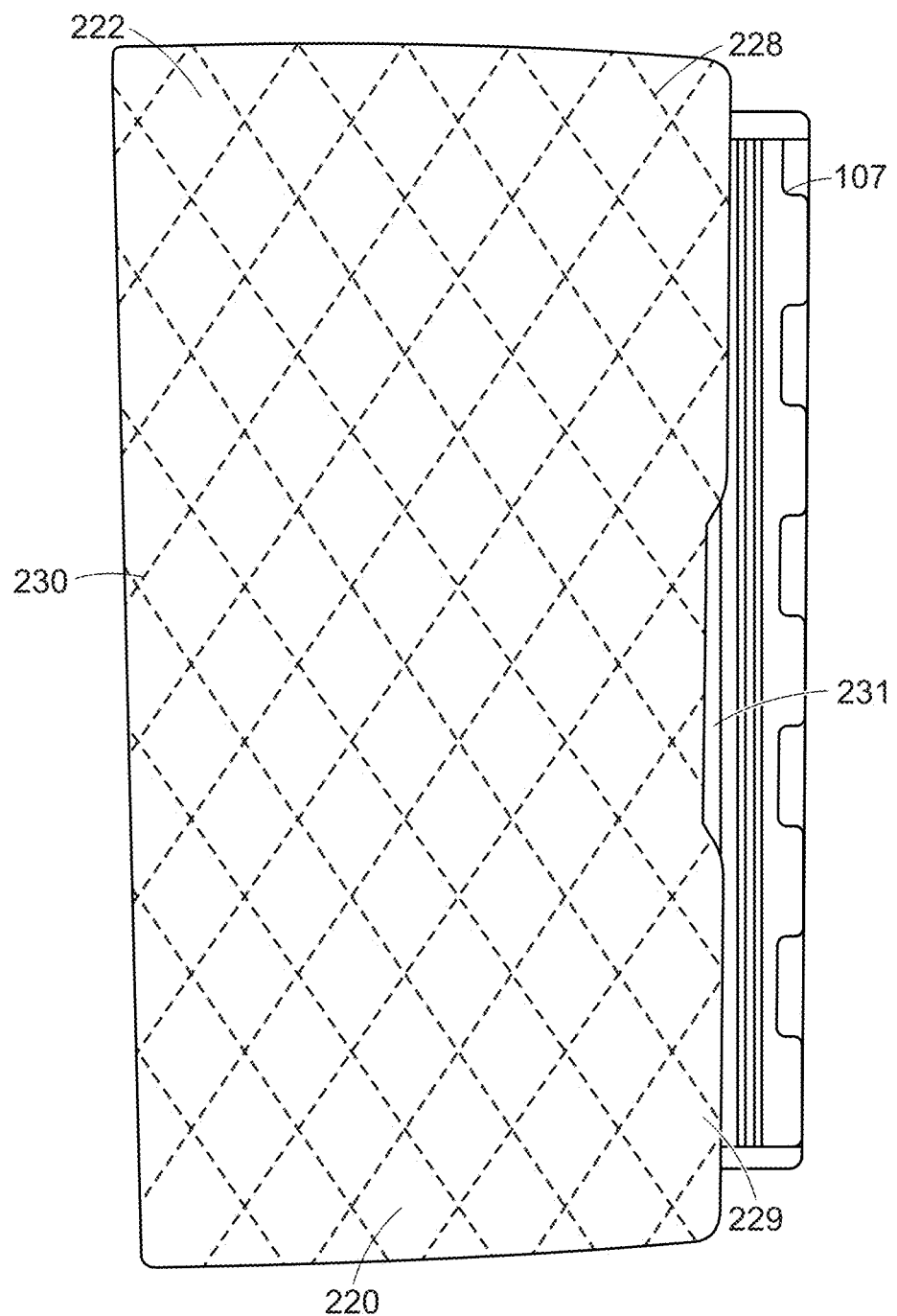
FIG. 31 is a bottom view of a cleaning sheet according to some embodiments.

As shown in FIGS. 29 and 31, for example, the multifunctional strip may include a long, nan-ow piece of material that is attachable to a surface-facing side of the face layer. As will be appreciated, the multifunctional strip may be placed on any suitable portion of the face layer, although it is shown as being located in a central portion of the face layer. For example, the multifunctional strip may be located in between a forward edge and a rear edge of the face layer. In some embodiments, the multifunctional strip may extend along an entire width of the cleaning sheet, although the strip may extend along only a portion of the width of the cleaning sheet in other embodiments.

In some embodiments, each of the face layer, the acquisition layer, and the retention layer are the same shape and same size, although the shape and size may vary from layer to layer. As shown in FIGS. 29 and 31, in some embodiments, each of the layers may be substantially rectangular in shape. In some embodiments, each of the face layer, the acquisition layer, and the retention layer include a cutout 231 (see, e.g., FIG. 31) in a central portion of the front edge of the layer. In some embodiments the cutout is adjacent to a central portion of the suction nozzle 107 when the cleaning sheet is attached to the tray.

The face layer 222 may be made with a hydrophobic material. The hydrophobic material may be arranged such that the weight of the unit puts a pressure on the layer such that liquid is allowed to penetrate the layer from the floor, but the material is able to help hold acquired liquid within the sheet. The face layer 222 may be treated with paraffin. In some embodiments, the paraffin improves the retention of solid particles on the sheet when the sheet is wetted, thereby reducing the potential for redeposit.

The face layer 222 may include a texture to aid with capturing debris from the floor. For example, the face layer 222 may include an embossed three-dimensional pattern with crevices in which debris can be held. The use of a vacuum cleaner in combination with the sheet reduces the amount of solid debris reaching the embossed face layer, thereby allowing the face layer to be used on a wet surface. The face layer may include a PET spunlace that is hydroentangled.

The acquisition layer 224 may be formed of thermal bonded airlaid. A density may be used which permits liquid to be absorbed from the floor and desorbed into the retention layer 226. The acquisition layer may be formed with a suitable percentage of bi-component to increase mechanical stability and reduce wet collapse. For example, in some embodiments, the thermal bonded air laid may be formed with 70% pulp and 30% bi-component. In some embodiments, the material may be formed with at least 30% of bi-component.

The retention layer 226 may have a higher density airlaid than the acquisition layer 224 to promote liquid migration from the acquisition layer into the retention layer. The higher density airlaid provides mechanical structure to reduce compression and retain liquid. In some embodiments, the retention layer material may be formed with 80% pulp and 20% bi-component. The retention layer material may be formed with 20% or less bi-component in some embodiments.

The multifunctional strip 220 may be formed with hydrophilic meltblown polypropylene in some embodiments. By using a hydrophilic material, the sheet may provide a more even wipe to reduce streakiness. The strip may help to break up stains in some embodiments. Additionally, in some embodiments, by providing a source of friction that is higher than the face layer, the multifunctional strip can provide feedback to the user indicating when more liquid as needed.

Figure 30:
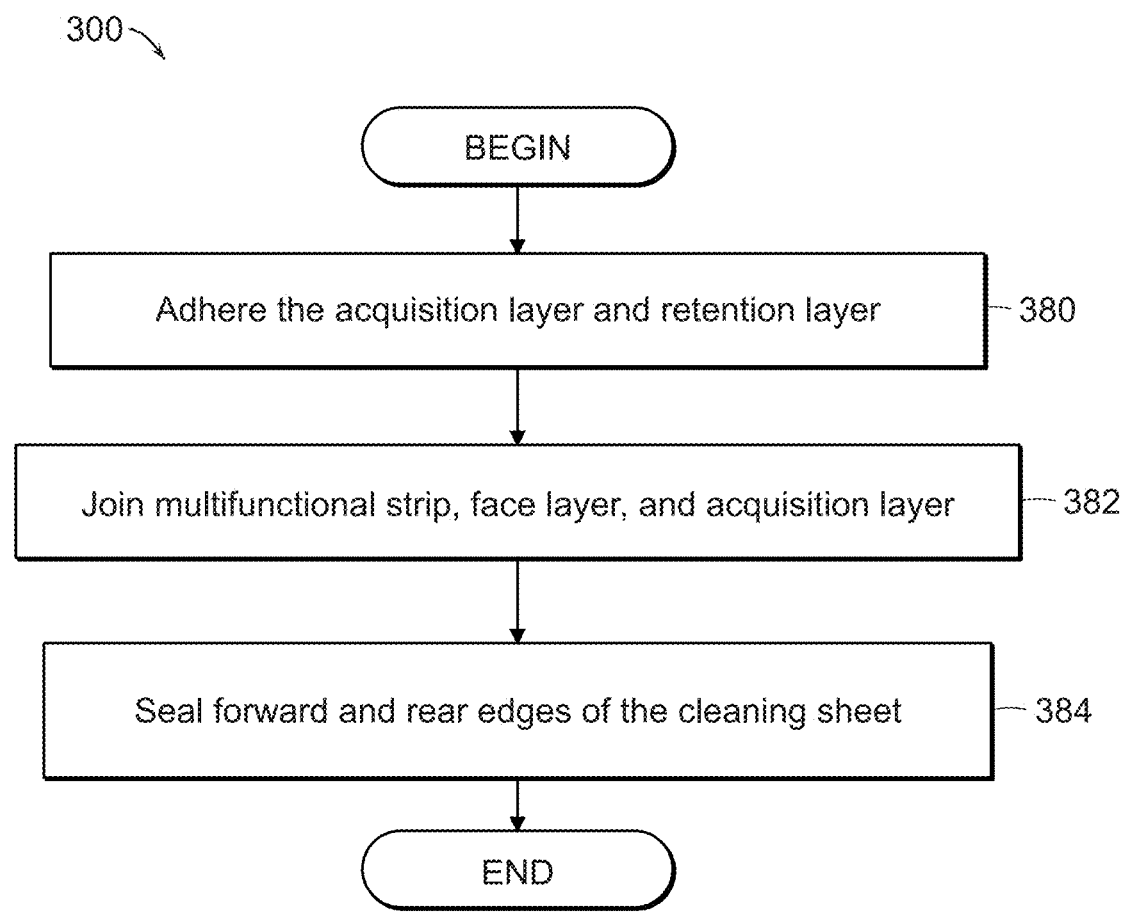
FIG. 30 illustrates a process of manufacturing a cleaning sheet according to some embodiments.

FIG. 30 illustrates a method of manufacturing 300 the cleaning sheet of FIG. 29. For example, in some embodiments, as shown in this view, an adhesive may be applied between the acquisition layer and the retention layer to adhere the layers to one another 380. Next, the multifunctional strip, the face layer, and the acquisition layer may be ultrasonically joined and/or welded together 382. As will be appreciated, prior to joining the layers together, the face layer may be placed on top of the acquisition layer, and the multifunctional strip may be placed on top of the face layer. As will be further appreciated, the layers may be stacked on top of one another such that the surface-facing sides of each layer are facing in the same direction (e.g., are upwardly facing).

In some embodiments, as shown in FIG. 31 the layers may be ultrasonically joined and/or welded via weld lines 228. In some embodiments, the weld lines may form a diamond pattern on the surface-facing side of the cleaning sheet, although the weld lines may form other suitable patterns in other embodiments.

In some embodiments, as shown in FIG. 30, the forward 229 and rear 230 edges of the cleaning sheet may then be sealed. For example, the face layer, the acquisition layer, and the retention layer may be ultrasonically welded and/or heat sealed to one another at the forward and rear edges. For purposes herein, the forward edge of the cleaning sheet includes the leading edge of the cleaning sheet when the cleaning head is attached to the cleaning device and the cleaning device is moved for cleaning (e.g., with the nozzle leading the direction of travel). In some embodiments, sealing the forward and rear edges of the cleaning sheet may prevent lamination of the of the cleaning sheet (e.g., pealing of one layer of the cleaning sheet from another layer of the cleaning sheet) during use.

In some embodiments, once the cleaning sheet has been prepared, an adhesive may be applied between the tray and the retention layer to attach the cleaning sheet to the tray and to the debris collection chamber.

Although the cleaning sheet is described as having some layers joined via adhesive and others via welding and/or sealing, it will be appreciated that all of the layers may be joined to one another via an adhesive. In such examples, an adhesive may be applied between each adjacent layer (e.g., between the acquisition layer and face layer, and via the face layer and multifunctional strip). The layers also may be joined together via other suitable arrangements.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A cleaning device replacement head, comprising:
    a housing having a chamber and a suction opening for allowing debris to flow into the chamber;
    a hydrophobic filter including a top surface and a bottom surface, the filter positioned to allow a suction force to be applied through the chamber and suction opening while preventing debris from passing therethrough; and
    a valve integrally formed with the hydrophobic filter and movable relative to the suction opening in response to a suction force applied to the chamber, the valve arranged to allow debris to enter the chamber while limiting debris from exiting the chamber.

2. The cleaning device replacement head of claim 1, wherein the filter forms a wall of the chamber.

3. The cleaning device replacement head of claim 1, wherein the valve is positioned to extend across the suction opening.

4. The cleaning device replacement head of claim 1, wherein the valve is movable.

5. The cleaning device replacement head of claim 1, wherein the valve is pivotally movable.

6. The cleaning device replacement head of claim 1, wherein the valve is movable between a first position in which the valve covers the suction opening and a second position in which the valve does not cover the suction opening.

7. The cleaning device replacement head of claim 1, wherein the valve is configured to rest against a lip formed within the chamber.

8. The cleaning device replacement head of claim 1, wherein the valve is attached to the chamber.

9. The cleaning device replacement head of claim 1, wherein the valve is formed from a material selected from the group consisting of a non-woven, a woven, and a plastic.

10. The cleaning device replacement head of claim 1, further comprising a cleaning sheet mated to the housing.

11. The cleaning device replacement head of claim 10, wherein the cleaning sheet is planar.

12. A cleaning device replacement head, comprising:
a dirt collection chamber having a suction opening for allowing debris to flow into the dirt collection chamber;
a hydrophobic filter including a top surface and a bottom surface, the filter positioned to allow a suction force to be applied to draw debris through the suction opening into the dirt collection chamber, while preventing debris from passing through the filter; and
a valve integrally formed with the hydrophobic filter and movable relative to the suction opening in response to a suction force applied to the dirt collection chamber, the valve allows debris to enter the chamber through the suction opening while limiting debris from exiting the chamber through the suction opening.

13. The cleaning device replacement head of claim 12, wherein the filter forms a wall of the dirt collection chamber.

14. The cleaning device replacement head of claim 12, wherein the valve is positioned to extend across the suction opening.

15. The cleaning device replacement head of claim 12, wherein the valve is movable.

16. The cleaning device replacement head of claim 12, wherein the valve is pivotally movable.

17. The cleaning device replacement head of claim 12, wherein the valve is movable between a first position in which the valve covers the suction opening and a second position in which the valve does not cover the suction opening.

18. The cleaning device replacement head of claim 12, wherein the valve is configured to rest against a lip formed within the chamber.

19. The cleaning device replacement head of claim 12, wherein the valve is attached to the dirt collection chamber.

20. The cleaning device replacement head of claim 12, wherein the valve is formed from a material selected from the group consisting of a non-woven, a woven, and a plastic.

21. The cleaning device replacement head of claim 12, further comprising a cleaning sheet mated to the dirt collection chamber.

22. The cleaning device replacement head of claim 20, wherein the cleaning sheet is planar.

* * * * *